United States Patent
Fujii

(10) Patent No.: US 7,688,827 B2
(45) Date of Patent: Mar. 30, 2010

(54) COMMUNICATION APPARATUS, COMMUNICATION METHOD, PROGRAM, AND STORAGE MEDIUM

(75) Inventor: Kenichi Fujii, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 11/816,256

(22) PCT Filed: Feb. 14, 2006

(86) PCT No.: PCT/JP2006/302526

§ 371 (c)(1),
(2), (4) Date: Aug. 14, 2007

(87) PCT Pub. No.: WO2006/088016

PCT Pub. Date: Aug. 24, 2006

(65) Prior Publication Data

US 2009/0052344 A1    Feb. 26, 2009

(30) Foreign Application Priority Data

Feb. 15, 2005    (JP)    ............... 2005-038319

(51) Int. Cl.
*H04L 12/28* (2006.01)
(52) U.S. Cl. .................. 370/394; 370/395.2
(58) Field of Classification Search .......... 370/389, 370/394, 395.2
See application file for complete search history.

(56) References Cited

U.S. PATENT DOCUMENTS

| | | | |
|---|---|---|---|
| 6,552,743 B1 * | 4/2003 | Rissman | 348/207.2 |
| 6,683,999 B2 * | 1/2004 | Ito et al. | 382/305 |
| 7,545,406 B2 * | 6/2009 | Itsukaichi | 348/207.2 |
| 7,561,288 B2 * | 7/2009 | Yano et al. | 358/1.15 |
| 7,561,782 B2 * | 7/2009 | Shiohara | 386/107 |

FOREIGN PATENT DOCUMENTS

| | | |
|---|---|---|
| JP | 09-298677 | 11/1997 |
| JP | 2000-069405 | 3/2000 |
| JP | 2001-522168 | 11/2001 |
| WO | 2004/015932 | 2/2004 |

OTHER PUBLICATIONS

Translation of international preliminary report on patentabiliy for International Application No. PCT/JP2006/302526; previously submitted in Japanese with International Search Report on Aug. 14, 2007.

International Search Report issued on Apr. 4, 2006 for International Application No. PCT/JP2006/302526.

* cited by examiner

*Primary Examiner*—Jayanti K Patel
*Assistant Examiner*—Bo Hui A Zhu
(74) *Attorney, Agent, or Firm*—Cowan, Liebowitz & Latman, P.C.

(57) ABSTRACT

A wireless communication method in a wireless communication apparatus, which can exchange data with another wireless communication apparatus via a wireless communication, searches for another wireless communication apparatus, and determines a function of the other wireless communication apparatus. The method selects a communication route required to wirelessly communicate with the other wireless communication apparatus in accordance with the function of the other wireless communication apparatus, and communicates data to the other wireless communication apparatus in accordance with the selected communication route.

6 Claims, 28 Drawing Sheets

FIG. 2

REGISTERED DEVICE PROPERTY LIST

| REGISTERED DEVICE AREA | DEVICE CLASS | GroupName | Bluetooth Address | Authentication | PIN CODE |
|---|---|---|---|---|---|
| My Living | DISPLAY | DPL333 | 12:34:56:78:9A:BC | ON | 0000 |
| | PRINTER | DPL333 | 12:34:56:78:90:EF | ON | 0101 |
| My Room | DISPLAY | DPR777 | 55:55:56:78:9A:BC | ON | 1010 |
| | PRINTER | DPR777 | 66:66:66:78:90:EF | ON | 4321 |
| My Office | DISPLAY PRINTER | DPO123 | AB:CD:EF:12:34:56 | ON | 7777 |
| Meeting Room1 | DISPLAY | DPM888 | AB:CD:EF:78:9A:BC | ON | 1010 |
| | PRINTER | DPM888 | 66:66:54:32:10:EF | OFF | N/A |

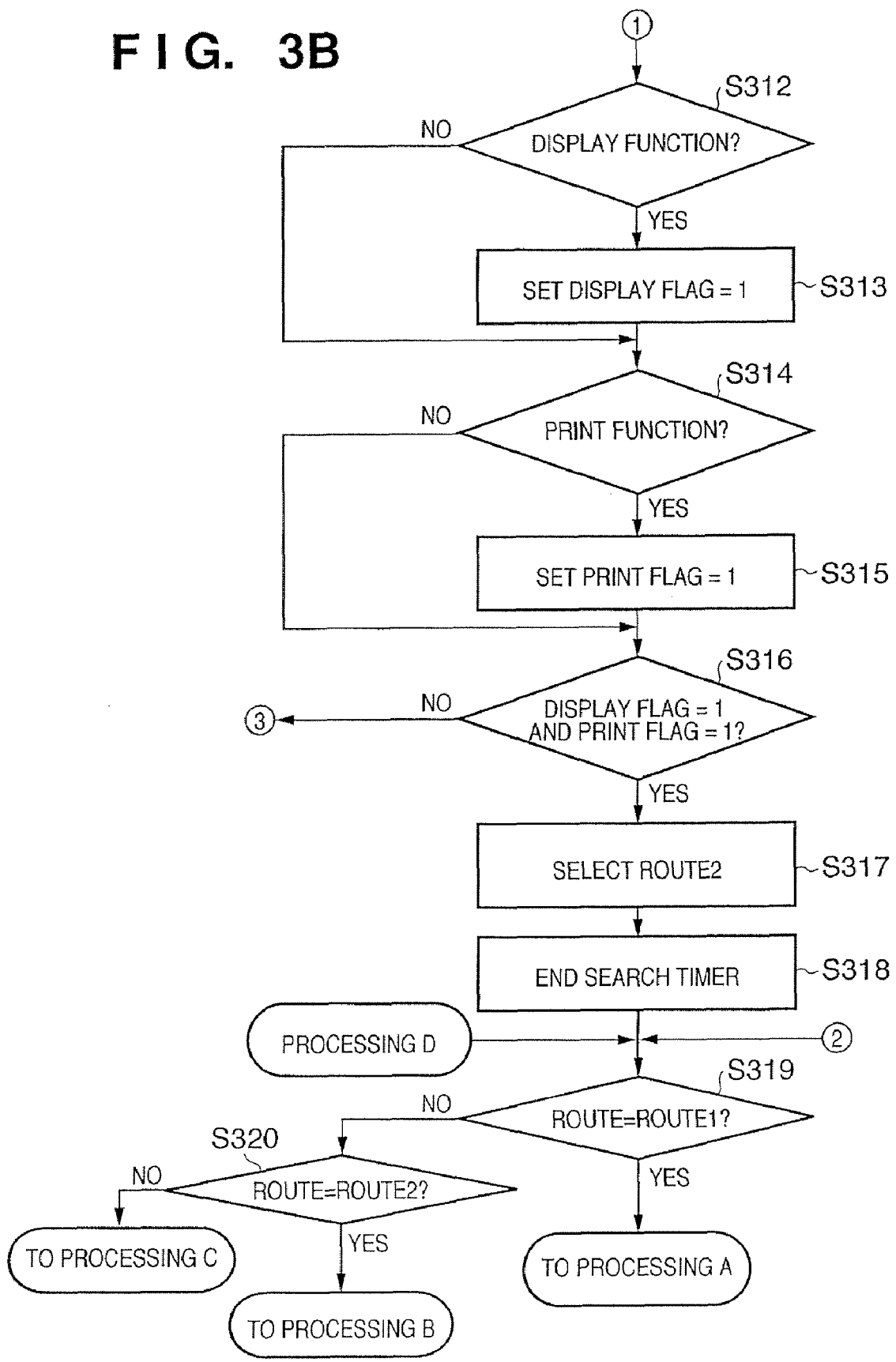

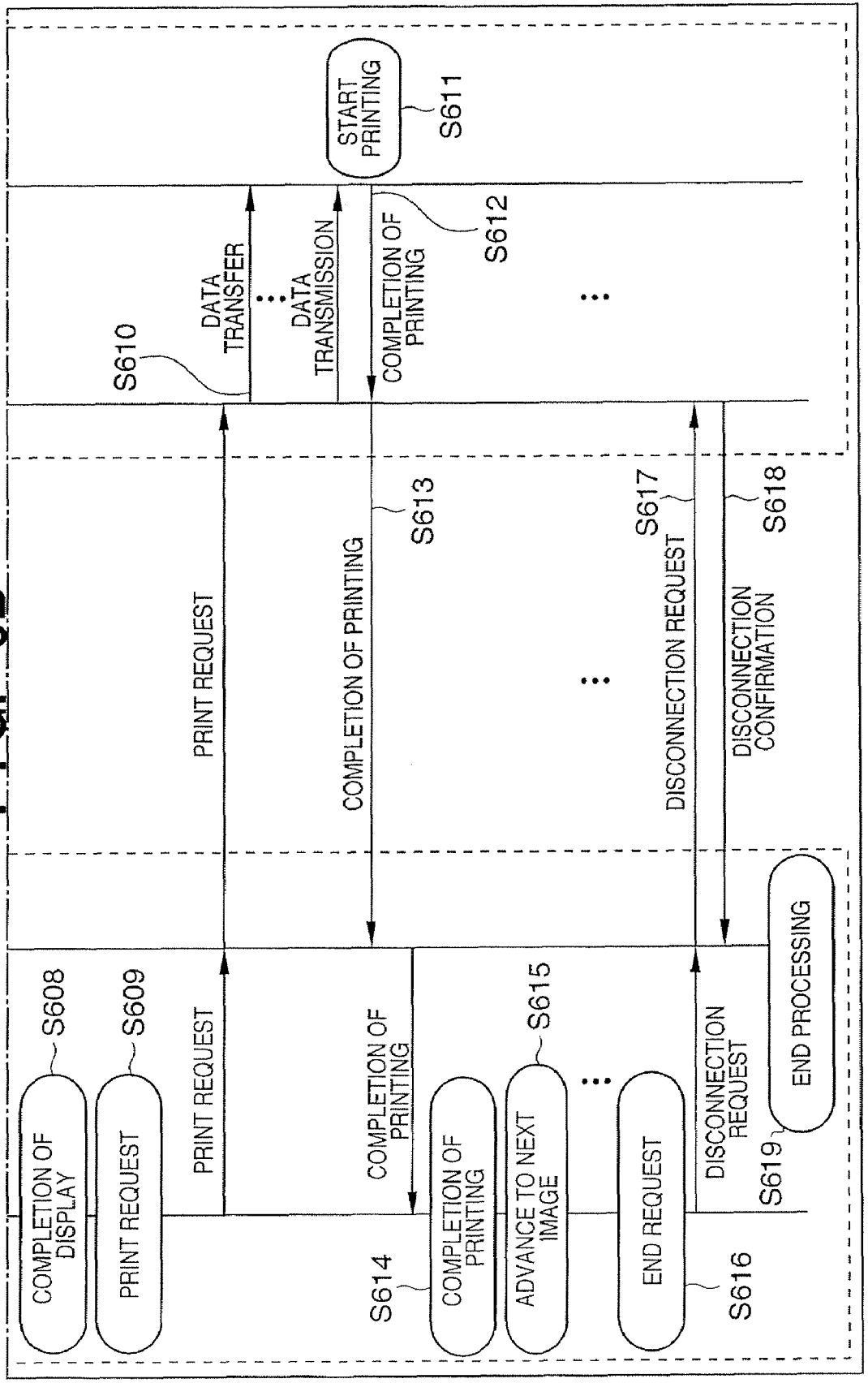

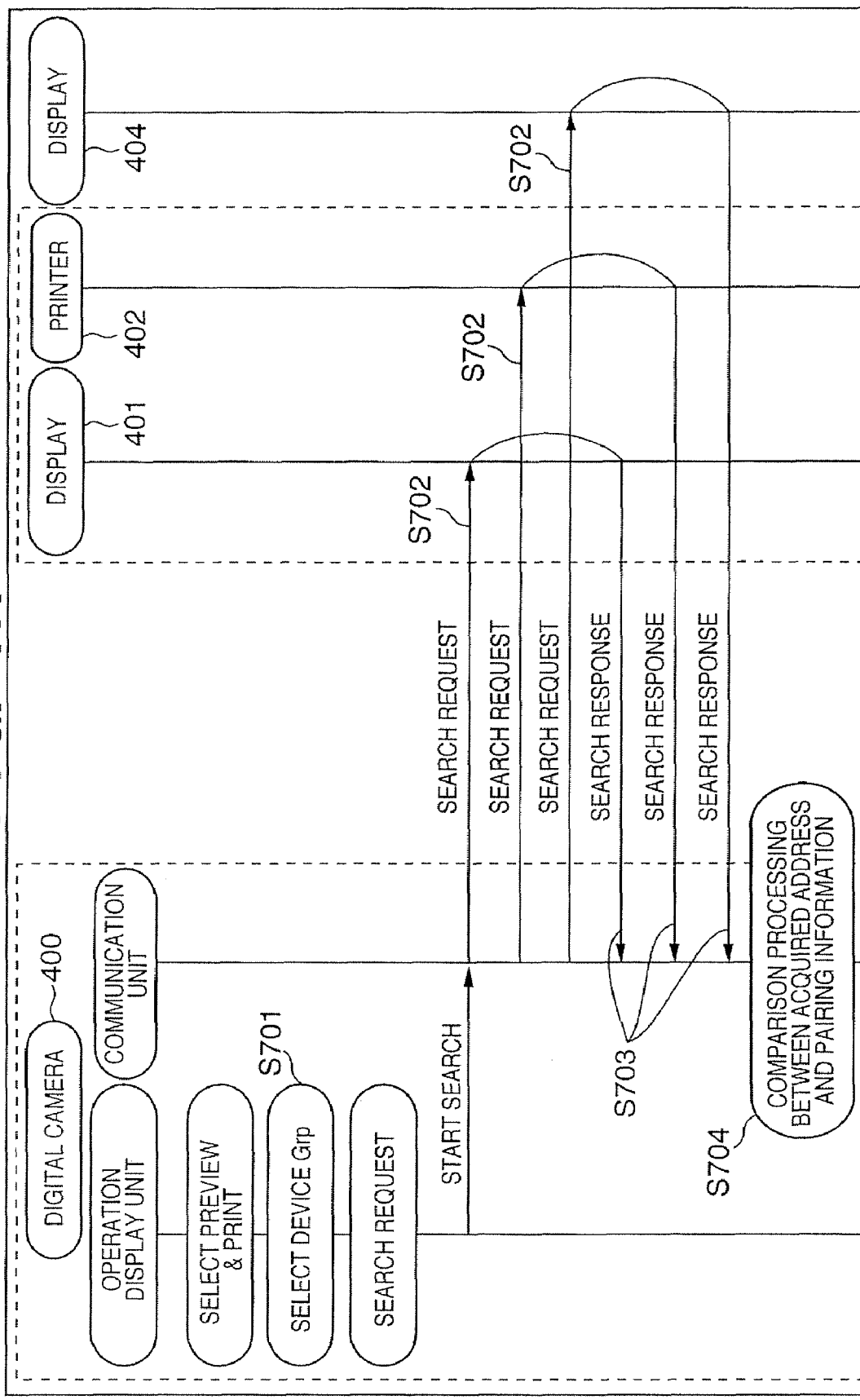

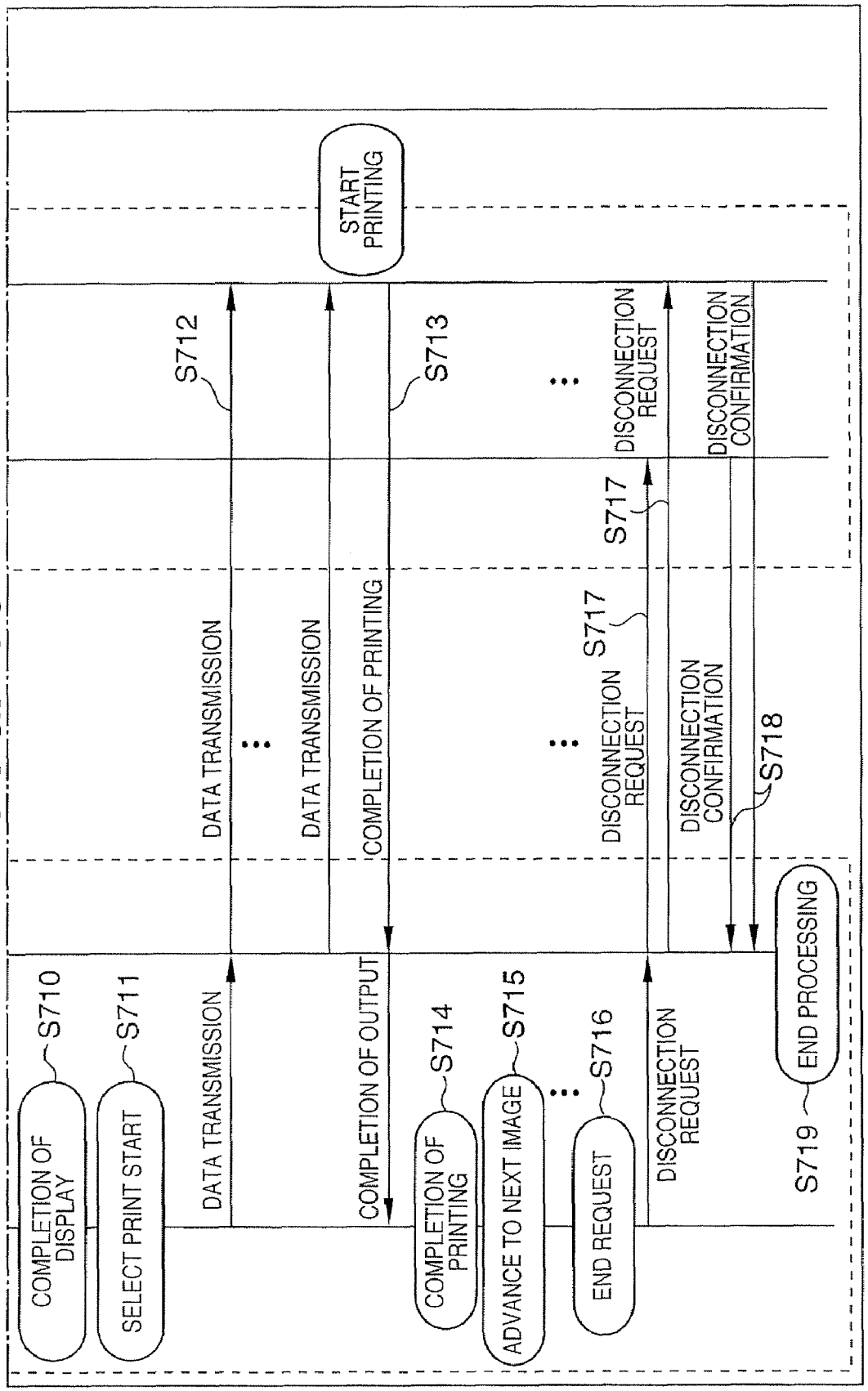

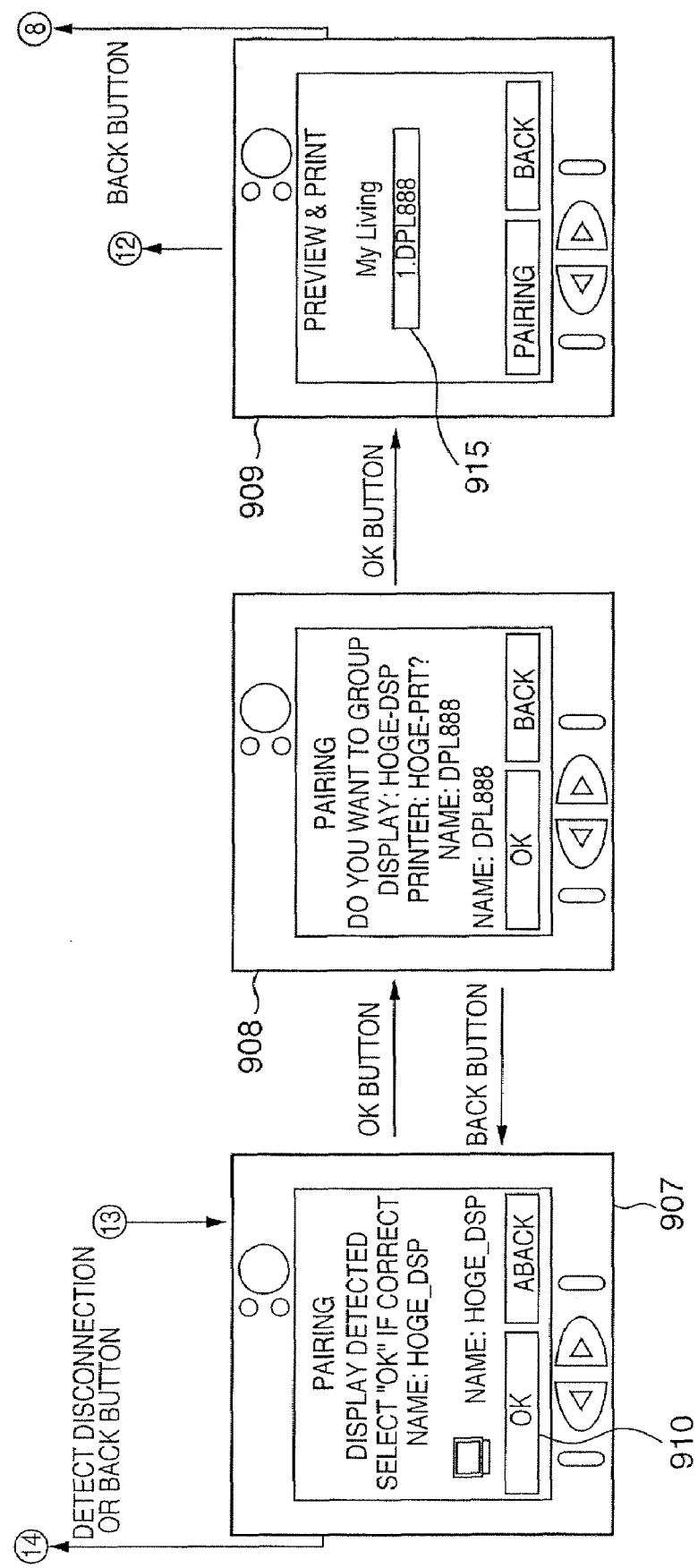

FIG. 10

REGISTERED DEVICE PROPERTY LIST

| REGISTERED DEVICE AREA | Device Class | Group Name | SSID | Connection Type | AuthType | Encryption | networkKey | EAP | Channel | UUID fixed | IP resolve |
|---|---|---|---|---|---|---|---|---|---|---|---|
| My Living | DISPLAY | DPL 888 | AP 001 | ESS | WPAPSK | AES | 123456789 ABCDEF0 | N/A | 1,2,3,4,5, 6,7,8,9,10, 11 | cea815d4-2eea | |
| | PRINTER | | | | | | | | | cea815d4-4e67 | DHCP |
| My Room | DISPLAY | DPR 123 | Adhoc 1 | IBSS | Open | WEP | 123456789 ABCDABC | N/A | 7 | abc15d4-9a23 | AutoIP |
| | PRINTER | DPR 123 | Adhoc 1 | IBSS | Open | WEP | 123456789 ABCDABC | | | abc15d4-8f67 | |
| My Office | DISPLAY PRINTER | DPO 432 | Office 9 | ESS | WPA | TKIP | 123456789 876543 | EAP/TLS | 1,2,3,4,5,6,7, 8,9,10,11 | cea128f-5267 | DHCP |
| Meeting Room1 | DISPLAY | DPM 777 | AP Meet1 | ESS | N/A | TKIP | ABC456789 ABCDABC | EAP/TLS | 1,2,3,4,5, 6,7,8,9,10, 11 | cea815d4-3e53 | DHCP |
| | PRINTER | | | | | | | | | cea815d4-67e8 | |

F I G. 11A
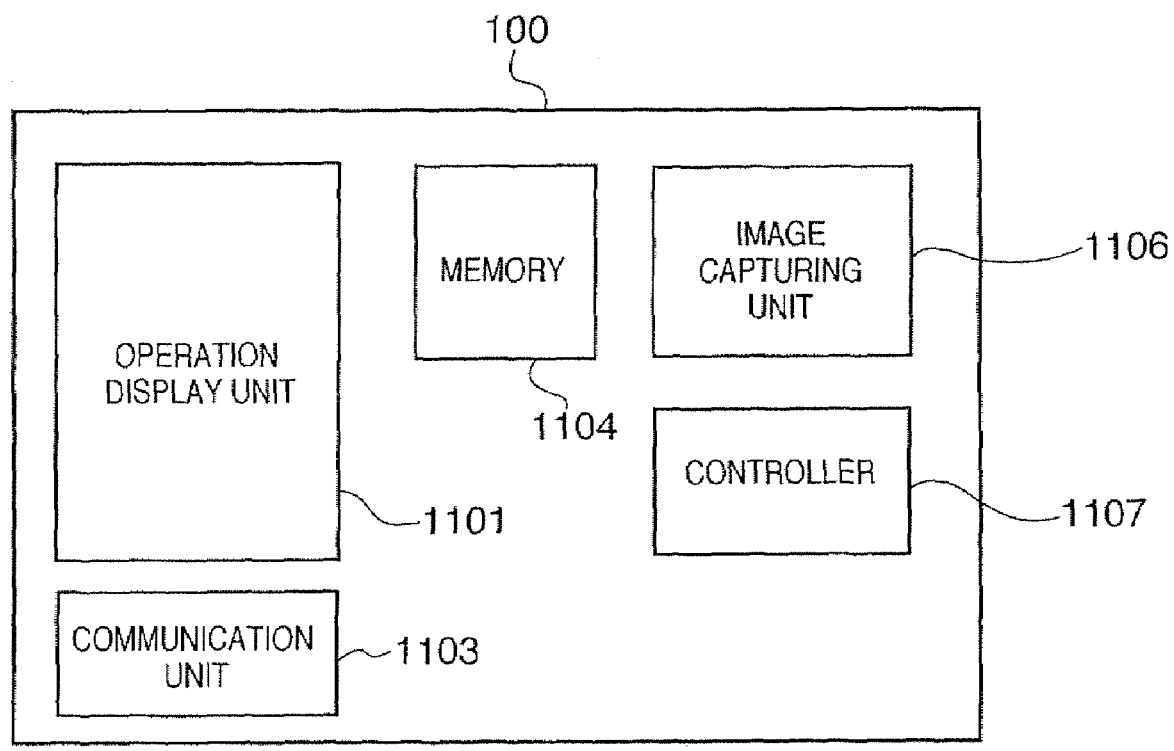

COMMUNICATION APPARATUS, COMMUNICATION METHOD, PROGRAM, AND STORAGE MEDIUM

TECHNICAL FIELD

The present invention relates to a communication apparatus, communication method, program, and storage medium.

BACKGROUND ART

As connections between devices, for example, it is possible to directly connect a digital camera to a printer to print desired images, or to connect a digital camera to a display (TV monitor or the like) to play a slideshow that automatically displays images in the digital camera on the display (use of a device function due to the connection between devices will be collectively referred to as "service" hereinafter) and the like.

For example, the user sometimes wants to use a plurality of services such as a print service, display service, and the like. In this case, the user confirms images which are captured by the digital camera and are displayed on a high-resolution, large-screen display, and selects desired images. Then, the user connects the digital camera to the printer and prints the selected images.

However, since a troublesome operation is required to switch these connections, it is a common practice to temporarily load captured images of the digital camera into a personal computer, to launch an application for playing a slideshow of images on the personal computer, to confirm and select desired images, and to then issue a print request of the selected images from the personal computer side to the printer side.

Even in this case, a series of these operations are cumbersome since the user must manually switch connections between devices via cables, and perform the temporary loading operations of images into the personal computer.

The invention associated with "video display apparatus" of patent reference 1 (Japanese Patent Laid-Open No. 9-298677) discloses the following contents. That is, images stored in a TV receiver which comprises a video printer are displayed on a video display unit of a remote controller, and a print request of a designated image is issued from the remote controller.

The invention associated with "digital image formation and printing system" of patent reference 2 (Japanese Patent Laid-Open No. 2000-69405 (U.S. Pat. No. 6,552,743)) discloses the following contents. An image in a digital camera is displayed on a display equipped on a printer by making a direct communication with the printer by a simple operation, and is printed after confirmation.

DISCLOSURE OF INVENTION

Problems that the Invention is to Solve

However, according to the contents of patent reference 1, the TV and printer operate not integrally but as independent devices. For this reason, patent reference 1 cannot cover a configuration that can be applied to that used in general home.

Since the contents of patent reference 2 assume that the printer and display are integrated, the display size depends on the printer size and cost. For this reason, when a user who already has a large-screen, high-resolution display, wants to review an image to be printed in detail, such a demand cannot be met. In this case, although the display and printer are integrated to eliminate the user's troublesome operations, when the user who possesses a large-screen, high-resolution display, reviews an image to be printed using that display, he or she must connect the display and the digital camera to confirm an image, and then re-connect the printer and the digital camera again to execute the print operation of a desired image. Hence, the problem that forces troublesome operations on the user remains unsolved.

Nowadays, environments that allow wireless communication among all devices are being created. In such environments, a requirement that identical operability is provided to the user without regard to any network configuration in a state in which network forms of a device that integrates a display and printer (display-printer integrated device), devices as a display and printer which operate independently, and the like are mixed is not satisfied. A problem posed when these plurality of services and devices are operated in collaboration with each other remains unsolved.

The present invention has been made to solve the problems of the aforementioned background arts and has as its object to provide a communication technique which allows easily setting selection of a communication route required to use a plurality of services and devices in collaboration with each other according to devices when devices are connected to each other.

Alternatively it is an object of the present invention to provide a communication technique which allows execution of data processing by collaboration of a plurality of devices when pairing information of grouped devices is compared with a search result to select a communication route corresponding to selected devices, and to make a communication between the selected devices.

Means of Solving the Problems

In order to achieve one of the aforementioned objects, a communication apparatus according to the present invention mainly comprises the following arrangement.

According to one aspect of the present invention, there is provided a communication apparatus comprising:

a search unit adapted to search for another communication apparatus;

a determination unit adapted to determine a function of the other communication apparatus searched by the search unit;

a selection unit adapted to select a communication route required to communicate with the other communication apparatus in accordance with the determined function of the other communication apparatus; and a communication unit adapted to communicate data to the another communication apparatus in accordance with the communication route selected by the selection unit.

According to the present invention, when devices are connected to each other, selection of a communication route required to use a plurality of services and devices in collaboration with each other can be easily set according to the devices.

Or pairing information of grouped devices is compared with a search result, and a communication route corresponding to the selected devices is selected to make a communication between the devices, thus allowing data processing by collaboration of a plurality of devices.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodi

FIG. 2 is a table of a communication device list after a device A—digital camera 100 has made registration of a device that can communicate using the Bluetooth® wireless communication standard;

FIG. 3B is a flowchart for explaining the operation of the digital camera 100 according to the first embodiment of the present invention;

FIG. 6B is a sequence chart of the digital camera 100 and display-integrated printer 103 according to the first embodiment of the present invention;

FIG. 7A is a sequence chart of a digital camera 400, display 401, printer 402, and display 404 according to the second embodiment of the present invention;

FIG. 7C is a sequence chart of the digital camera 400, display 401, printer 402, and display 404 according to the second embodiment of the present invention;

FIG. 9C shows a display example of the operation display unit of the digital camera 400 according to the second embodiment of the present invention;

FIG. 10 is a table of a communication device list after the device A—digital camera 100 has made registration of a device that can communicate using the Bluetooth® wireless communication standard;

FIG. 11A is a schematic block diagram showing the arrangement of a wireless communication device (digital camera) according to an embodiment of the present invention;

BEST MODE FOR CARRYING OUT THE INVENTION

First Embodiment

Figure 1:
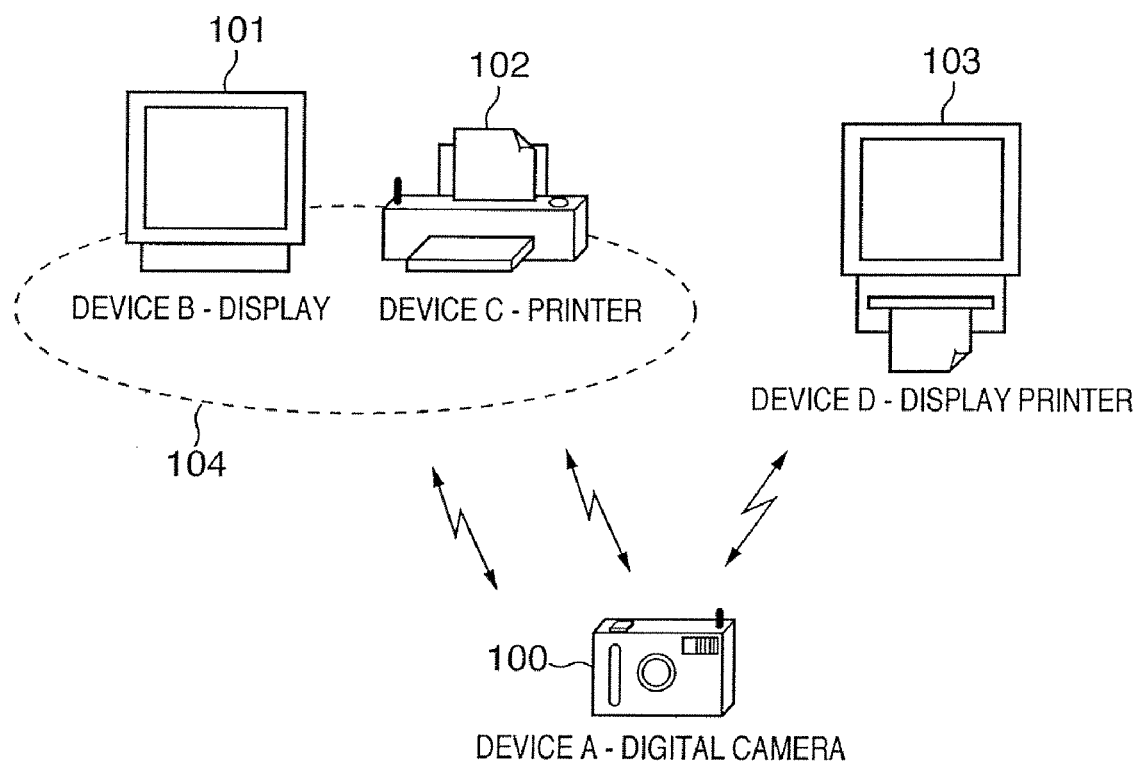
- FIG. 1 is a view showing the overall arrangement of a wireless communication system including wireless communication devices according to the first embodiment of the present invention.

An embodiment of the present invention will be described hereinafter with reference to the accompanying drawings. FIG. 1 is a view showing the overall arrangement of a wireless communication system including wireless communication devices according to the first embodiment of the present invention. Referring to FIG. 1, reference numeral 100 denotes a wireless communication device according to one embodiment of the present invention.

FIG. 1 shows the following wireless communication devices. That is, reference numeral 100 denotes a digital camera (to be referred to as "device A—digital camera" hereinafter) having wireless communication means; 101, a display (to be referred to as "device B—display" hereinafter) having wireless communication means; 102, a printer (to be referred to as "device C—printer" hereinafter) having wireless communication means; and 103, a display printer (to be referred to as "device D—display printer" hereinafter) which has wireless communication means in which a display and printer are integrated. A device obtained by combining devices B and C can serve as a display printer (to be referred to as "device E—display printer 104" hereinafter). These devices can exchange data including commands and captured images to each other by wireless communications based on spread spectrum such as a communication based on the IEEE802.11b standard, or Bluetooth®.

The device E—display printer 104 is prepared by virtually grouping the device B—display 101 and the device C—printer 102 as one device when viewed from the device A—digital camera 100. Hence, the device B—display 101 and the device C—printer 102 have no relation between them and can operate independently of each other.

Figure 11B:
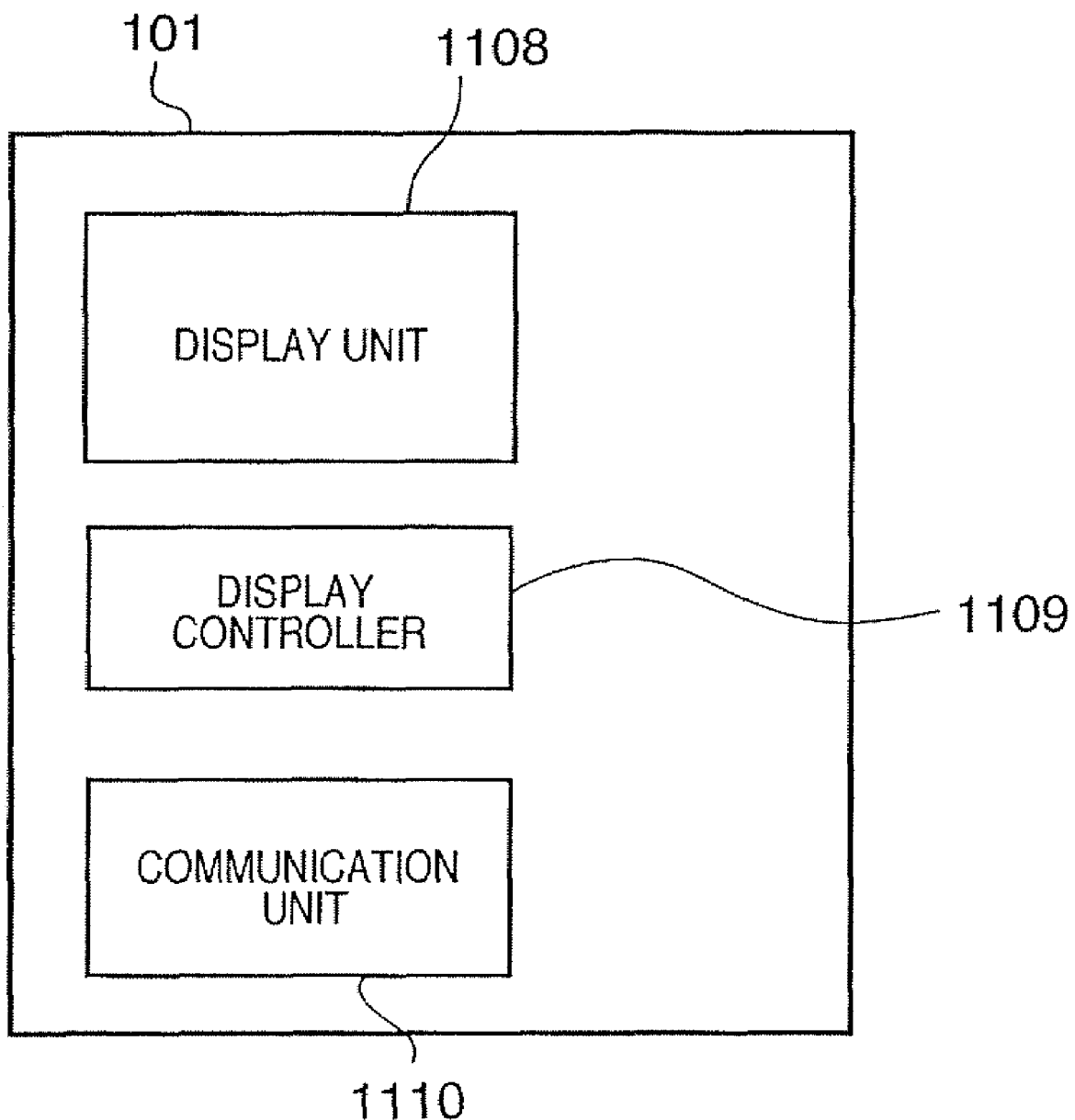
FIG. 11B is a schematic block diagram showing the arrangement of a wireless communication device (display) according to an embodiment of the present invention.

FIGS. 11A to 11D show the schematic arrangements of the device A—digital camera 100, device B—display 101, device C—printer 102, and device D—display printer 103. The device A—digital camera 100 comprises an operation display unit 1101, communication unit 1103, memory 1104 (including a detachable recording medium), image capturing unit 1106, and controller 1107 (FIG. 11A). The image capturing unit 1106 captures an object image (to be also simply referred to as "image" hereinafter) under the control of the controller 1107. The captured image is stored in the memory 1104, and can be displayed on the operation display unit 1101 under the control of the controller 1107. The communication unit 1103, which serves as the wireless communication means, can exchange data including commands and captured images with other devices by wireless communications based on spread spectrum such as a communication based on the IEEE802.11b standard, or Bluetooth®.

The device B—display 101 comprises a display unit 1108, display controller 1109, and communication unit 1110 (FIG. 11B). The communication unit 1110, which serves as the wireless communication means, can exchange data including commands and captured images with other devices by wireless communications based on spread spectrum such as a communication based on the IEEE802.11b standard, or Bluetooth®. Data received by the communication unit 1110 is displayed on the display unit 1108 under the control of the display controller 1109.

Figure 11C:
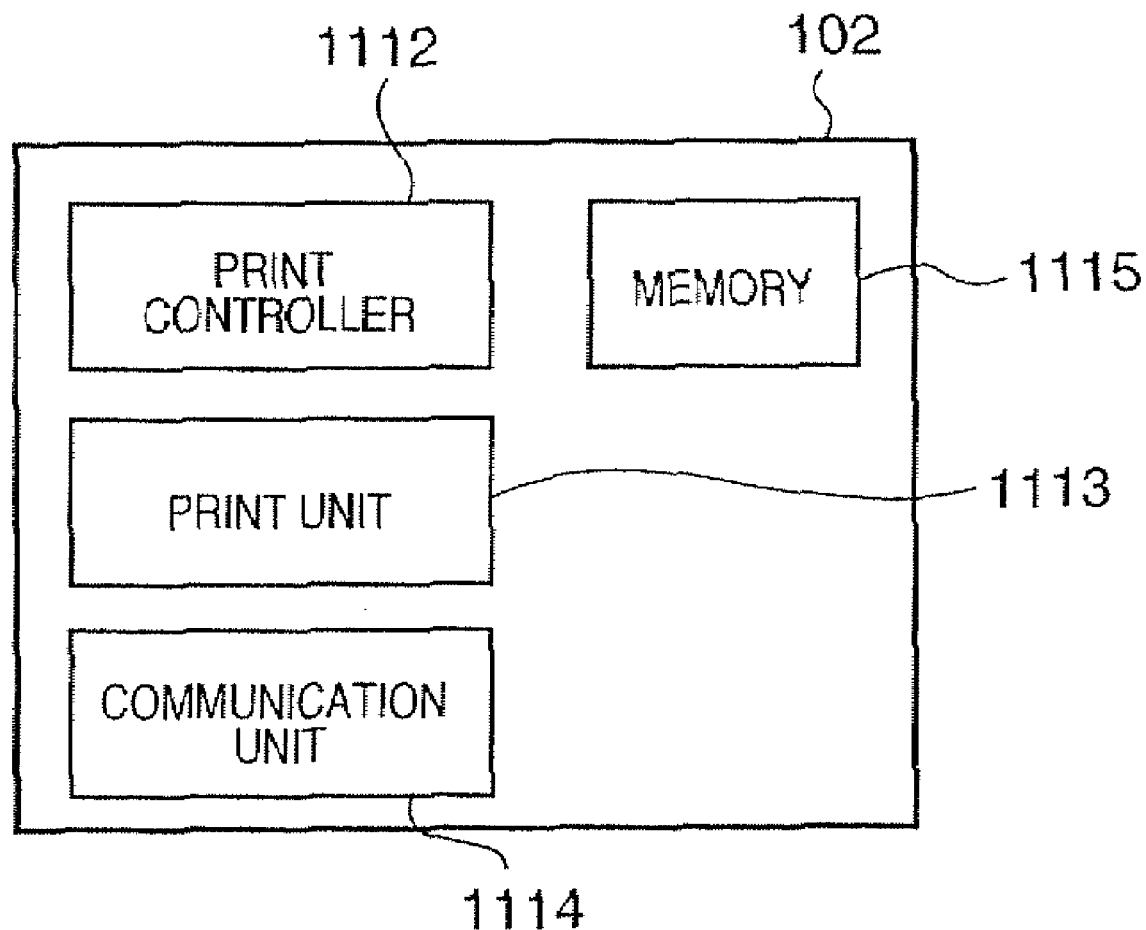
FIG. 11C is a schematic block diagram showing the arrangement of a wireless communication device (printer) according to an embodiment of the present invention.

The device C—printer 102 comprises a print controller 1112, print unit 1113, communication unit 1114, and memory 1115 (FIG. 11C). The communication unit 1114, which serves as the wireless communication means, can exchange data including commands and captured images with other devices by wireless communications based on spread spectrum such as a communication based on the IEEE802.11b standard, or Bluetooth®. The print controller 1112 controls the print unit 1113 based on data received by the communication unit 1114 to execute print processing. Alternatively the print controller 1112 temporarily stores data received by the communication unit 1114 in the memory 1115, and can control the print unit 1113 to execute print processing according to reception of a print instruction.

Figure 11D:
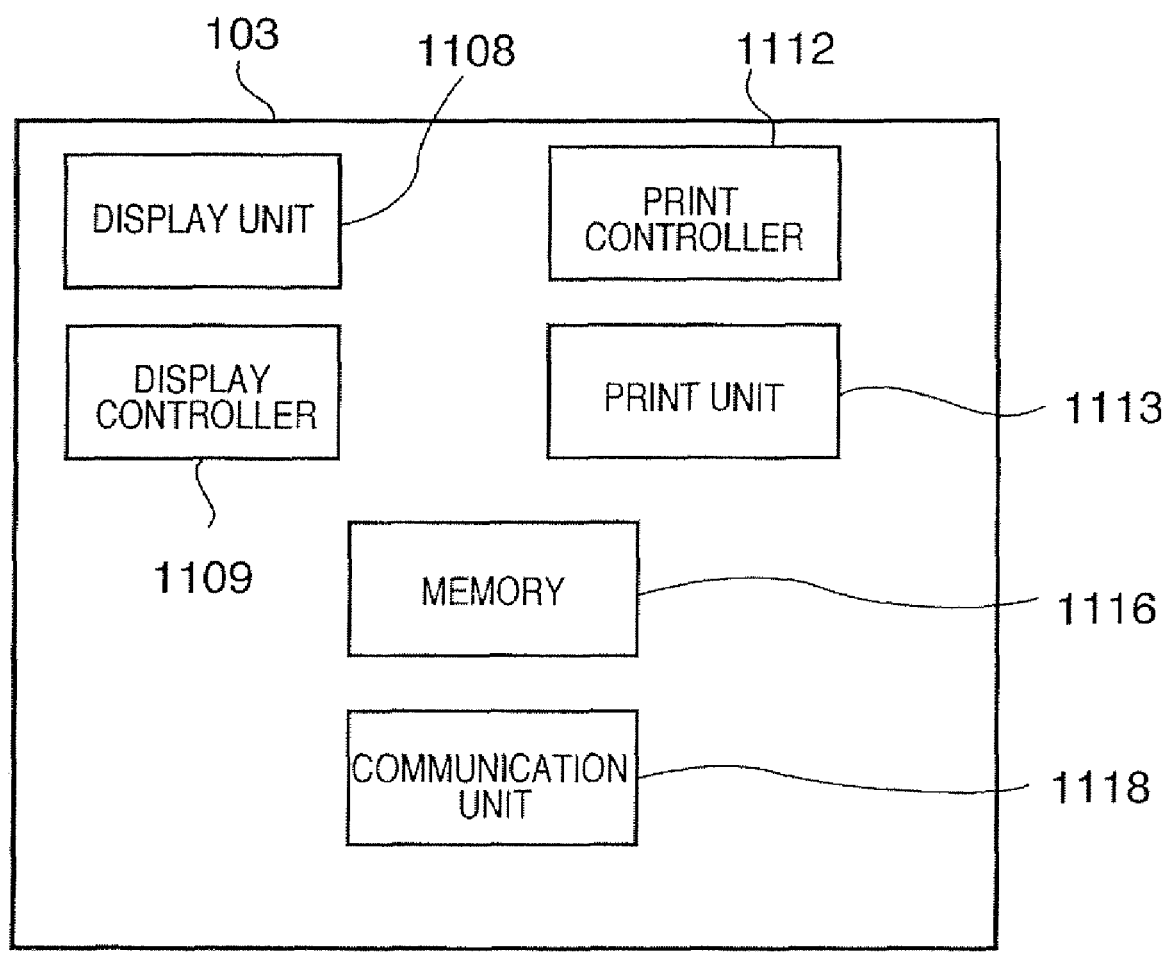
FIG. 11D is a schematic block diagram showing the arrangement of a wireless communication device (display printer) according to an embodiment of the present invention.

The device D—display printer 103 comprises a display unit 1108, display controller 1109, print controller 1112, print unit 1113, memory 1116 (including a detachable storage medium), and communication unit 1118 (FIG. 11D). The communication unit 1118, which serves as the wireless communication means, can exchange data including commands and captured images with other devices by wireless communications based on spread spectrum such as a communication based on the IEEE802.11b standard, or Bluetooth®. The display controller 1109 displays image data received by the communication unit 1118 on the display unit 1108. At this time, the image data is cached in the memory 1116, and when the communication unit 1118 receives a print request, the print controller 1112 controls the print unit 1113 to start print processing using the image data cached in the memory 1116.

Figure 5A:
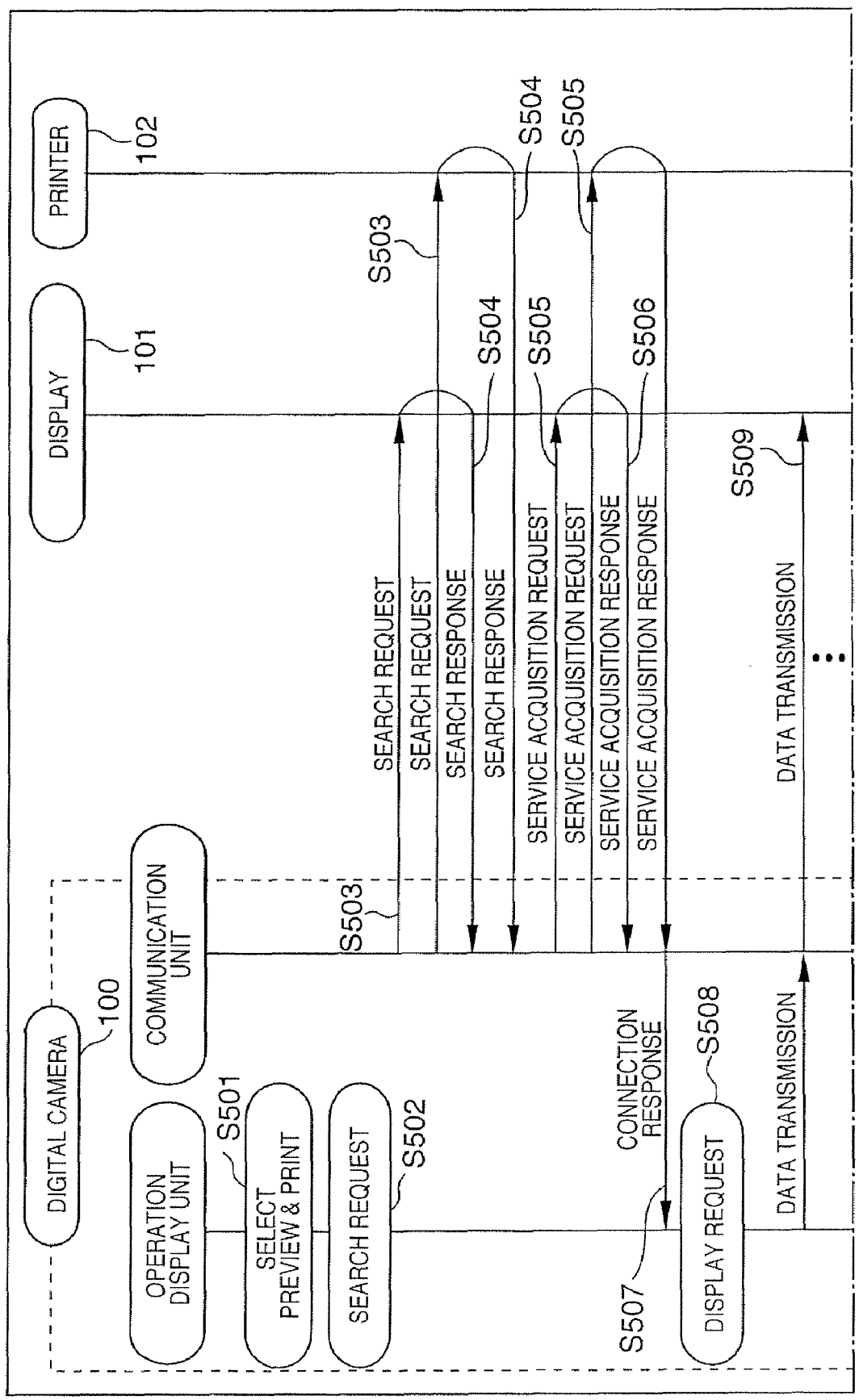
FIG. 5A is a sequence chart of the digital camera 100, a display 101, and a printer 102 according to the first embodiment of the present invention.
Figure 5B:
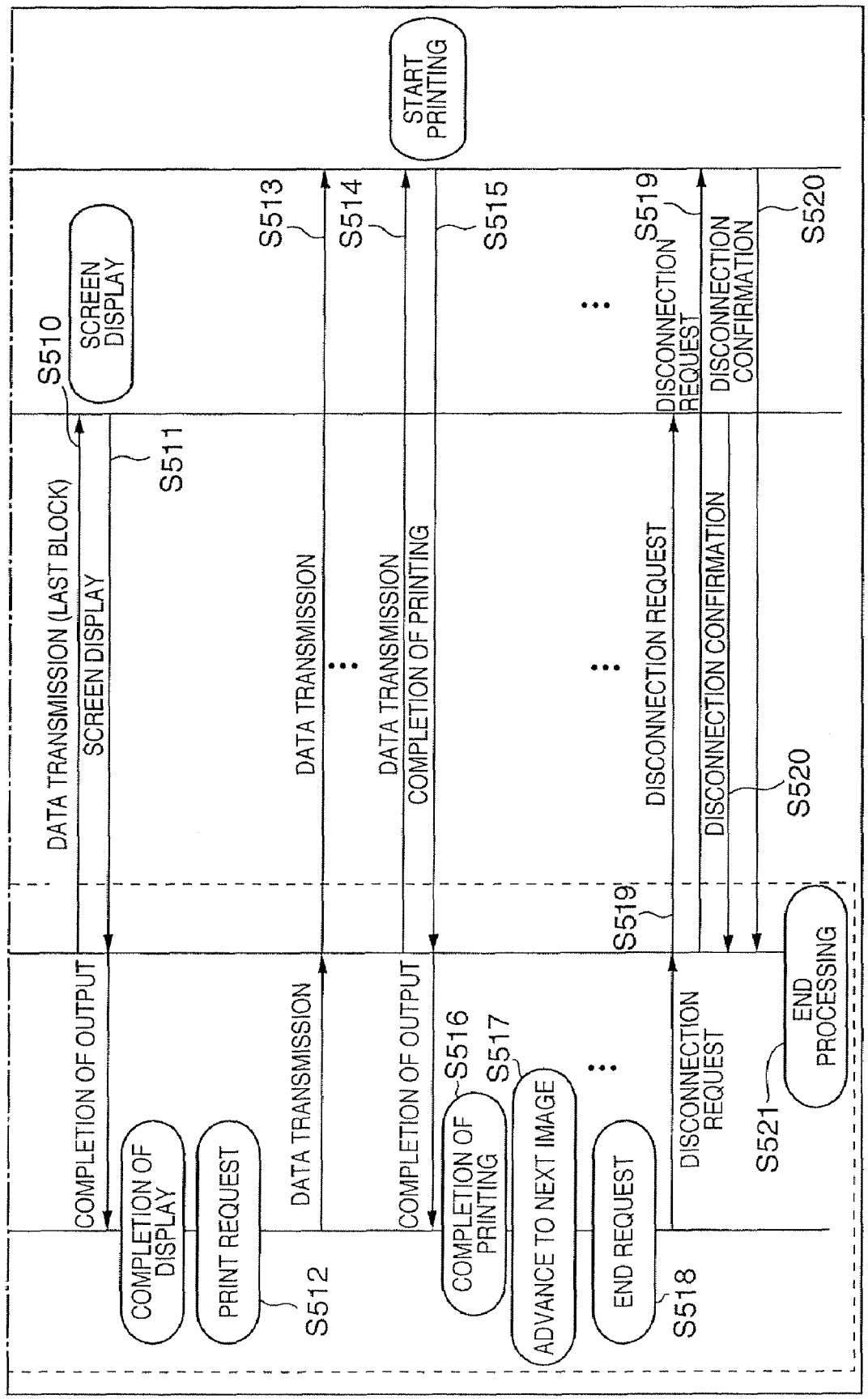
FIG. 5B is a sequence chart of the digital camera 100, display 101, and printer 102 according to the first embodiment of the present invention.

FIGS. 5A and 5B show the procedures of the communication sequence to be exchanged among the device A—digital camera 100 (to be also simply referred to as "digital camera 100" hereinafter), device B—display 101 (to be also simply referred to as "display 101" hereinafter), and device C—printer 102 (to be also simply referred to as "printer 102" hereinafter) when an image selected by the digital camera 100 is to be printed using the printer 102 while it is previewed on the display 101. The procedures of the communication sequence in the wireless communication devices according to this embodiment will be described below with reference to FIGS. 5A and 5B.

In the digital camera 100, the user selects a Preview & Print function by menu selection on the operation display unit 1101 of the digital camera (S501), and inputs a device search request (S502). The communication unit 1103 of the digital camera 100 transmits the device search request to devices which exist on the same frequency (S503). Upon reception of the search request, each device transmits a search response that notifies the digital camera 100, which transmitted this request, of the presence of the device. In this case, the display 101 and printer 102 transmit search responses, and the communication unit 1103 of the digital camera 100 receives the search responses from these devices (S504).

Subsequently, the communication unit 1103 of the digital camera 100 transmits a service acquisition request used to inquire about service functions of the respective devices to the devices which transmit the search responses (S505). Upon reception of the service acquisition request, each device transmits a service acquisition response to the digital camera 100 so as to notify the digital camera 100 of its own service functions.

The communication unit 1103 of the digital camera 100 receives the service acquisition responses from the display 101 and printer 102 (S506), and the controller 1107 checks if the responses include that from a device having a display function and that from a device having a printer function. If the responses include those from the device having the display function and that having the printer function, the communication unit 1103 notifies the operation display unit 1101 of the digital camera of that information in the form of a connection response (S507). The operation display unit 1101 recognizes based on this notification that the responses include those from the device having the display function and that having the printer function, and displays a display button and print button used to make the user issue an image display instruction using the display 101 and a print instruction using the printer 102 (S508).

After the user selects an image and then selects the display button, the controller 1107 side of the digital camera 100 recognizes that the display 101 and printer 102 operate as independent devices. Hence, the communication unit 1103 transmits the selected image data to the display 101 in response to an instruction from the controller 1107 (S509). After transmission of the last block of the image data (S510), the communication unit 1103 receives, from the display 101, a screen display signal which indicates that reception of the image data is completed, and the image is displayed (S511), and displays a message indicating that display is completed on the operation display unit 1101. Then, the user recognizes that the image is displayed on the display 101.

If the user is satisfied with the image displayed on the display 101, he or she selects the print button on the operation display unit of the digital camera 100 to input a print instruction, thus issuing a print request. The communication unit 1103 in turn transmits the image data to the printer 102 in response to an instruction from the controller 1107 (S513). Upon completion of transmission of the last block of the image data (S514), the communication unit 1103 receives a print completion signal indicating completion of print processing from the printer 102 (S515), and displays a print completion message on the operation display unit 1101, thus notifying the user of completion of printing (S516).

If the user wants to successively repeat the preview & print operation, the process advances to selection of the next image (S517), and the aforementioned processes are repeated (S508 to S516). If the user gives an end request instruction (S518), the communication unit 1103 of the digital camera 100 transmits a communication disconnection request to the display 101 and printer 102 (S519). The communication unit 1103 receives disconnection confirmation signals from the display 101 and printer 102 (S520), and executes end processing (S521).

Figure 6A:
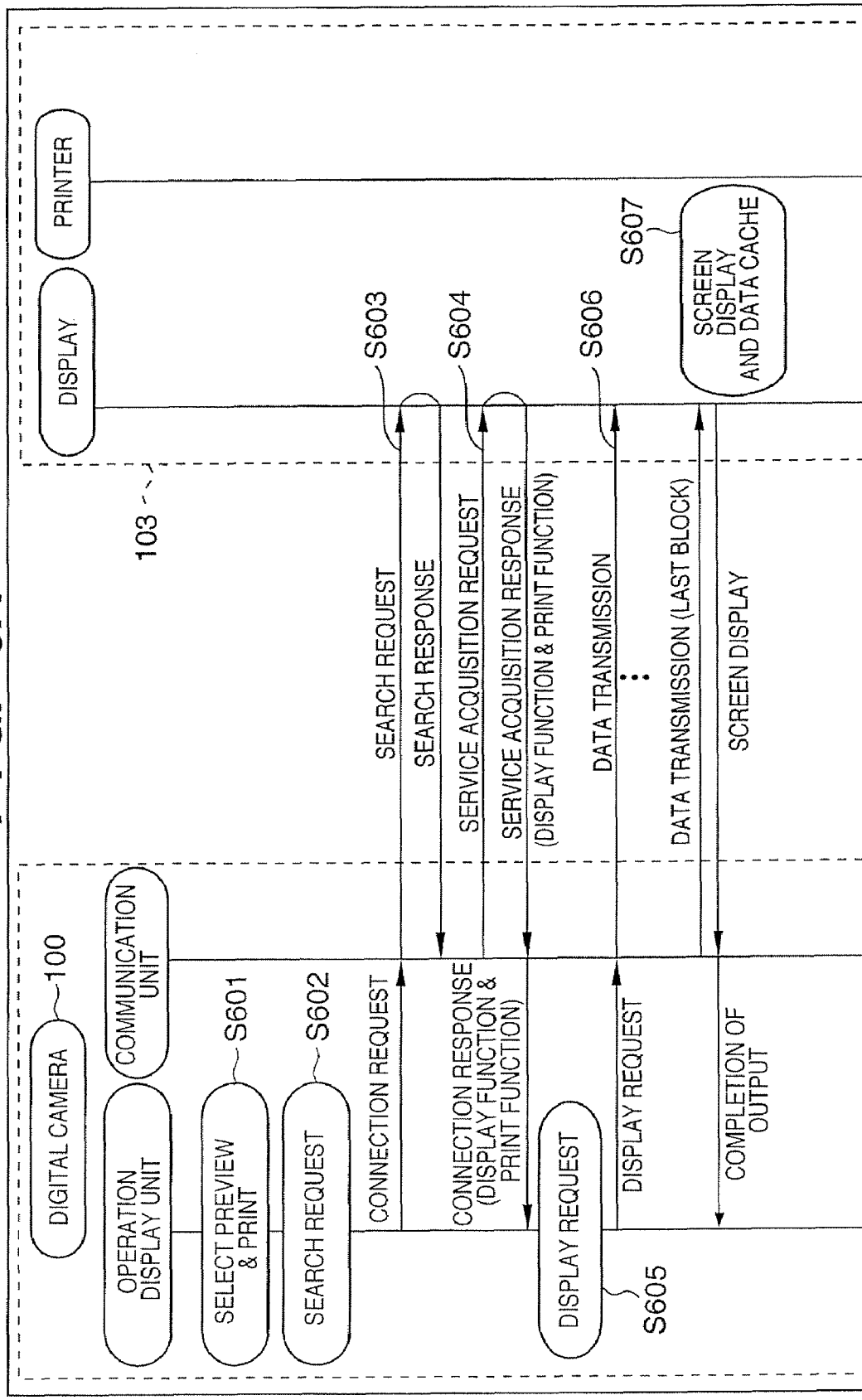
FIG. 6A is a sequence chart of the digital camera 100 and a display-integrated printer 103 according to the first embodiment of the present invention.

FIGS. 6A and 6B show the procedures of the communication sequence exchanged between the digital camera 100 and device D—display printer 103 (to be also simply referred to as "display printer 103" hereinafter; the display printer 103 is a device in which a printer and display integrally function or these devices are directly connected, and which can provide service functions of the two devices, i.e., preview and print functions in this case), when the digital camera 100 and display printer 103 provides the preview & print function.

In the digital camera 100, the user selects the Preview & Print function by menu selection (S601), and inputs a device search request (S602). The communication unit 1103 of the digital camera 100 transmits the device search request to devices which exist on the same frequency. In this case, the communication unit 1103 receives a search response from the display printer 103 having both the display function and printer function (S603).

Subsequently, the communication unit 1103 of the digital camera transmits a service acquisition request to the display printer 103, and receives a service acquisition response which indicates that the display printer 103 has a display function and print function (Display & Printer) as a response to the service acquisition request (S604). The communication unit 1103 then displays a display button and print button on the operation display unit 1101 of the digital camera 100 (S605).

The controller 1107 of the digital camera 100 can confirm based on the contents of the service acquisition response that the display printer 103, which transmitted the service acquisition response, has both the display function and printer function. After the user selects an image and then selects the display button (to select a display request) on the operation display unit 1101 of the digital camera 100, the communication unit 1103 transmits image data to the display printer 103 according to an instruction from the controller 1107 (S606). Upon reception of the last block of the image data (S607), the display printer 103 displays the image on its display unit 1108, and caches the received image data in the memory 1116 at the same time (S607). The display printer 103 then notifies the communication unit 1103 that a screen display is made. The communication unit 1103 notifies the operation display unit 1101 of that information, so as to display a message indicating that the screen display is made on the display unit 1108 of the display printer 103 (S608). If the user is satisfied with the displayed image, he or she selects the print button to issue a print request (S609).

The communication unit 1103 of the digital camera 100 transmits a print request to the display printer 103. After reception of the print request (as the image data itself, image data which was received when it was displayed on the screen and was cached in the memory 1116 is used), the display printer 103 transfers the previously cached image data to the print unit 1113 serving as the printer (S610), thus starting print processing (S611). Upon completion of transfer of the last data, if the print processing of the print unit 1113 is complete, the display printer 103 notifies the communication unit 1103 of the digital camera 100 of a print completion signal (S612 and S613). Upon reception of this notification, the communication unit 1103 notifies the operation display unit 1101 of completion of printing, and the operation display unit 1101 displays a print completion message for the user (S614). If the user wants to successively repeat the display (preview) & print operation, the process advances to selection of the next image (S615), and the aforementioned processes are repeated (S605 to S614).

If the user gives an end request instruction (S616), the communication unit 1103 of the digital camera 100 transmits a communication disconnection request to the display printer 103 (S617), and receives a disconnection confirmation signal from the display printer 103 (S618). The communication unit 1103 executes end processing (S619).

Figure 3A:
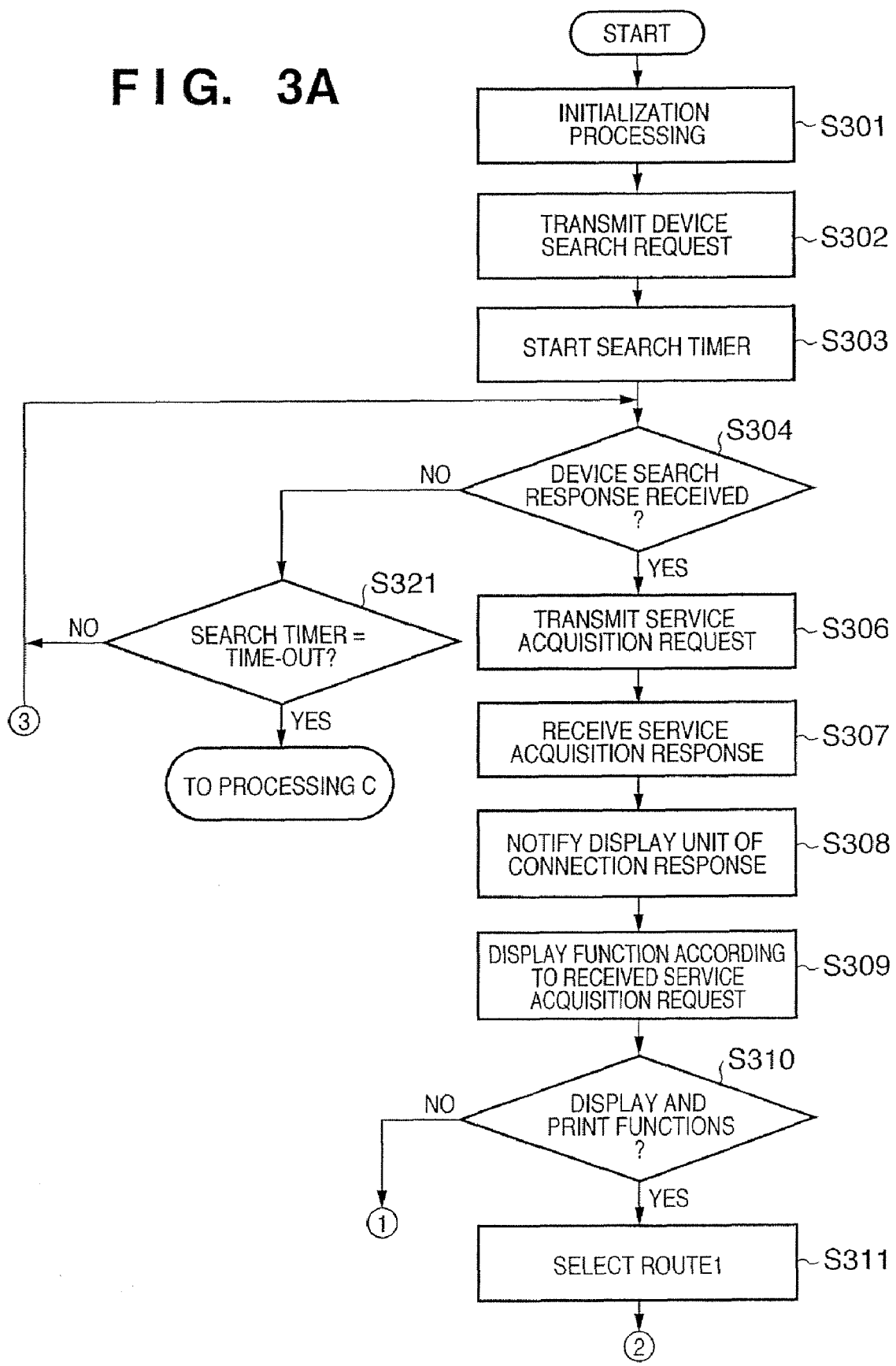
FIG. 3A is a flowchart for explaining the operation of the digital camera 100 according to the first embodiment of the present invention.

The procedures of the detailed operation of the digital camera 100 in association with communication route selection upon enabling the two sequences described using FIGS. 5A and 5B, and FIGS. 6A and 6B above will be described below with reference to the flowcharts of FIGS. 3A and 3B.

In step S301, the digital camera 100 starts, and executes initialization processing. In step S302, the digital camera 100 transmits a device search request, and starts a search timer (S303). The digital camera 100 executes reception control of a device search response (S304) until the search timer reaches a time-out (S321). If the search timer reaches a time-out (YES in S321) without receiving any device search response within a predetermined period of time (NO in S304), the process advances to the flowchart of processing C shown in FIG. 3F to display an error message indicating that a desired device is not found (S360).

On the other hand, if search responses are received (YES in S304), the digital camera 100 transmits a service acquisition request to the devices which transmitted the search responses (S306). The digital camera 100 receives service acquisition responses in step S307, and notifies the operation display unit 1101 of the reception of the service acquisition responses as connection responses (S308). With this notification, for example, the operation display unit 1101 recognizes reception of the responses from a device having a display function, that having a print function, and the like, and displays the functions of the devices which responded the service acquisition request according to the received service acquisition responses (S309). When the digital camera 100 is connected to another wireless communication device (to be also simply referred to as "wireless communication device" hereinafter) having a display function and print function, the operation display unit 1101 displays a display button and print button. When the digital camera 100 is connected to a device having one of the display function and print function, the operation display unit 1101 displays a button (e.g., one of a display button and print button) used to select the function of that wireless connection device.

If the connected device has the display function and print function (YES in S310), the process advances to step S311 to select ROUTE1, and the process then advances to step S319 of ROUTE comparison.

If it is determined in step S310 that the connected device has neither the display function nor the print function (NO in step S310), the process advances to step S312 to check if the device has a display function as a single unit (S312). If the device has a display function (YES in S312), "1" is set in a flag (Display Flag) indicating that the device has the display function (S313).

If the device does not have any display function (NO in S312), the process jumps to step S314 to check if the device has a print function (S314). If it is determined in step S314 that the device has a print function (YES in S314), "1" is set in a flag (Print Flag) indicating that the device has the print function (S315).

It is checked in step S316 if "1" is set in both the Display Flag and Print Flag (S316). If these devices are ready (i.e., "1" is set in both the flags) (YES in S316), the digital camera 100 selects ROUTE2 (S317), and executes search timer end processing (S318)

If "1" is not set in both the flags yet (NO in S316), the digital camera 100 repeats the device search response reception processing (S304) to the processing for checking the flag settings (S316).

The processing (YES in S319) executed when the selected route is ROUTE1 (the setting selected in S311) will be described below with reference to the flowchart of FIG. 3C. If ROUTE1 is selected, the controller 1107 of the digital camera 100 executes the processing (processing A) in step S325 and the subsequent steps of the flowchart in FIG. 3C.

The controller 1107 checks in step S325 if the digital camera 100 has already been connected to another wireless connection device having the display function and print function (e.g., the device D—display printer 103 in FIG. 1). If the digital camera 100 has already connected to such device (YES in S325), the process jumps to step S331, and the communication unit 1103 transmits an image transfer start request to the other wireless communication device (S331). On the other hand, if the digital camera 100 has not already been connected to that device yet (NO in S325), the controller 1107 starts the counting of a connection timer (S326), sets an address of the other wireless communication device having the display function and print function as a single device (S327), and transmits a connection request to the other wireless communication device (S328).

The controller 1107 waits until connection with the other wireless communication device having the display function and print function (device D—display printer 103) is confirmed (S329). If connection is confirmed (YES in S329), the controller 1107 stops counting of the connection timer (S330).

The communication unit 1103 transmits an image transfer start request to the other wireless communication device in the connection state (S331). If an image transfer permission is received from the other wireless communication device (YES in S332), the controller 1107 transfers image data (S333). In the digital camera 100, when the user selects an image from the operation display unit 1101, and selects the display button, the selected image data is transmitted to the other wireless communication device having the display function and print function. This image data is displayed on the display unit 1108 of the display-integrated printer 103, and is cached in the memory 1116 to be stored so that it can be used upon printing. Upon completion of transfer of the image data (YES in S334), the control enters the flowchart (processing E) of FIG. 3G.

Figure 3C:
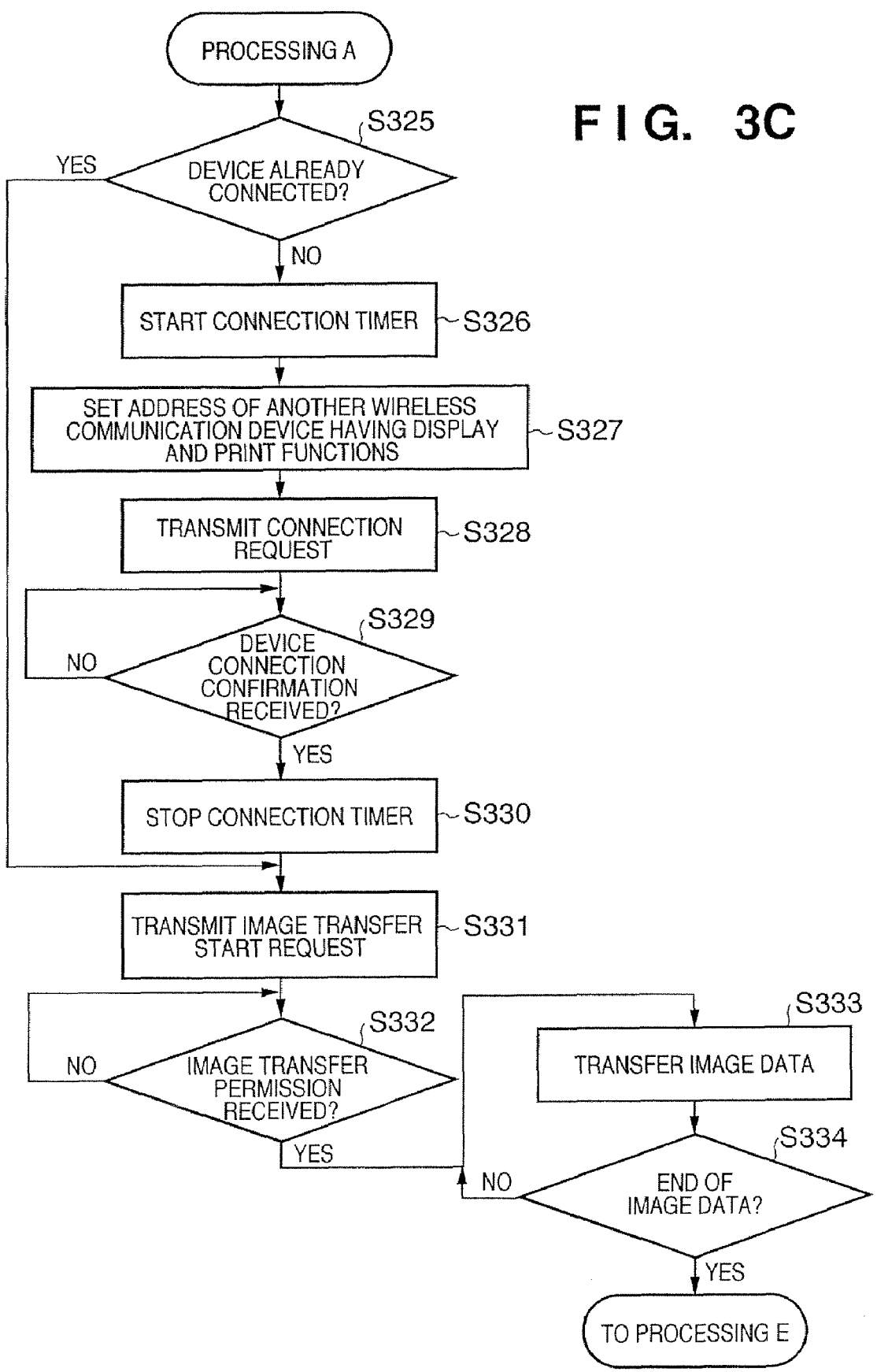
FIG. 3C is a flowchart for explaining the operation of the digital camera 100 according to the first embodiment of the present invention.
Figure 3D:
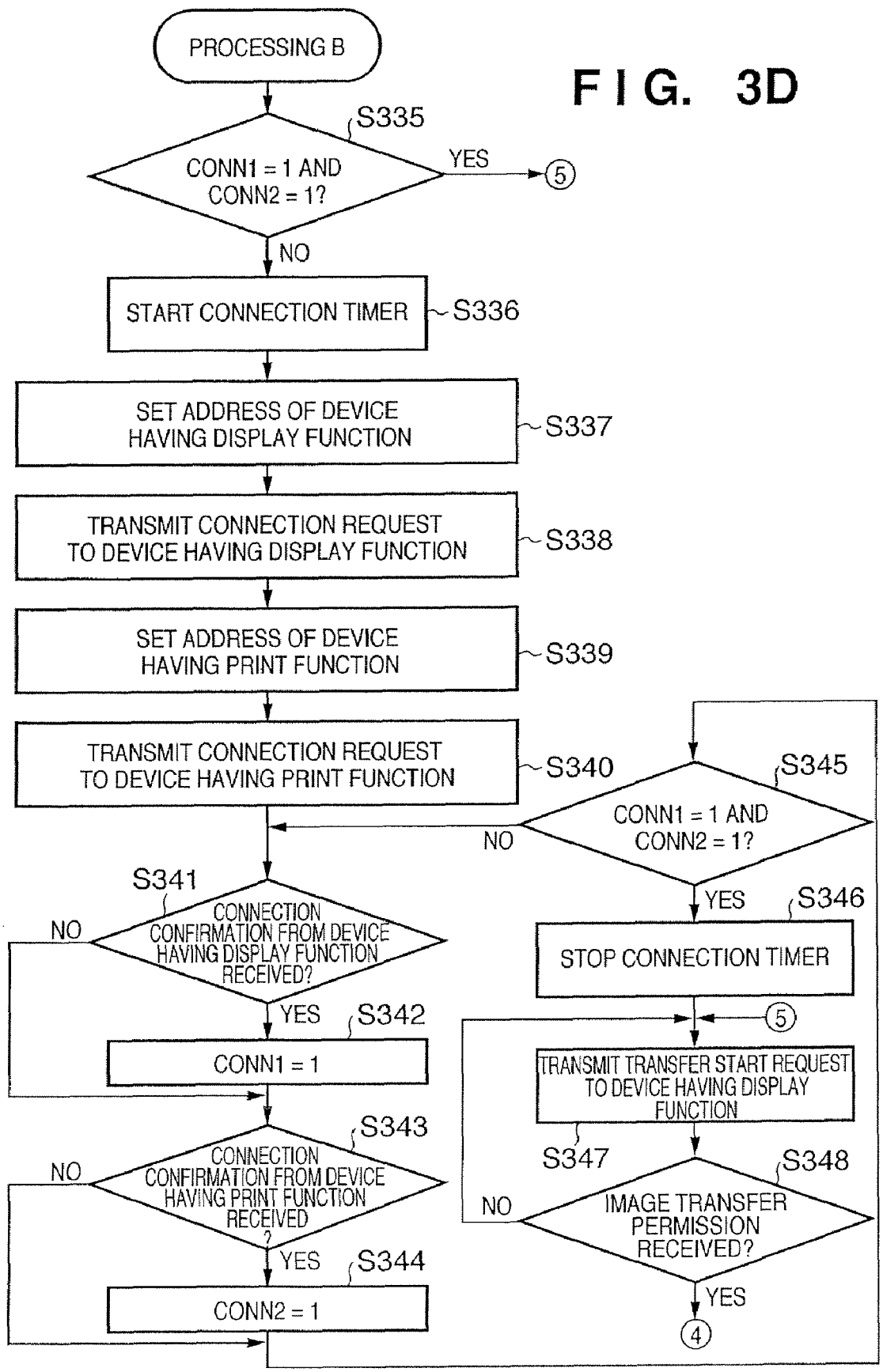
FIG. 3D is a flowchart for explaining the operation of the digital camera 100 according to the first embodiment of the present invention.
Figure 3E:
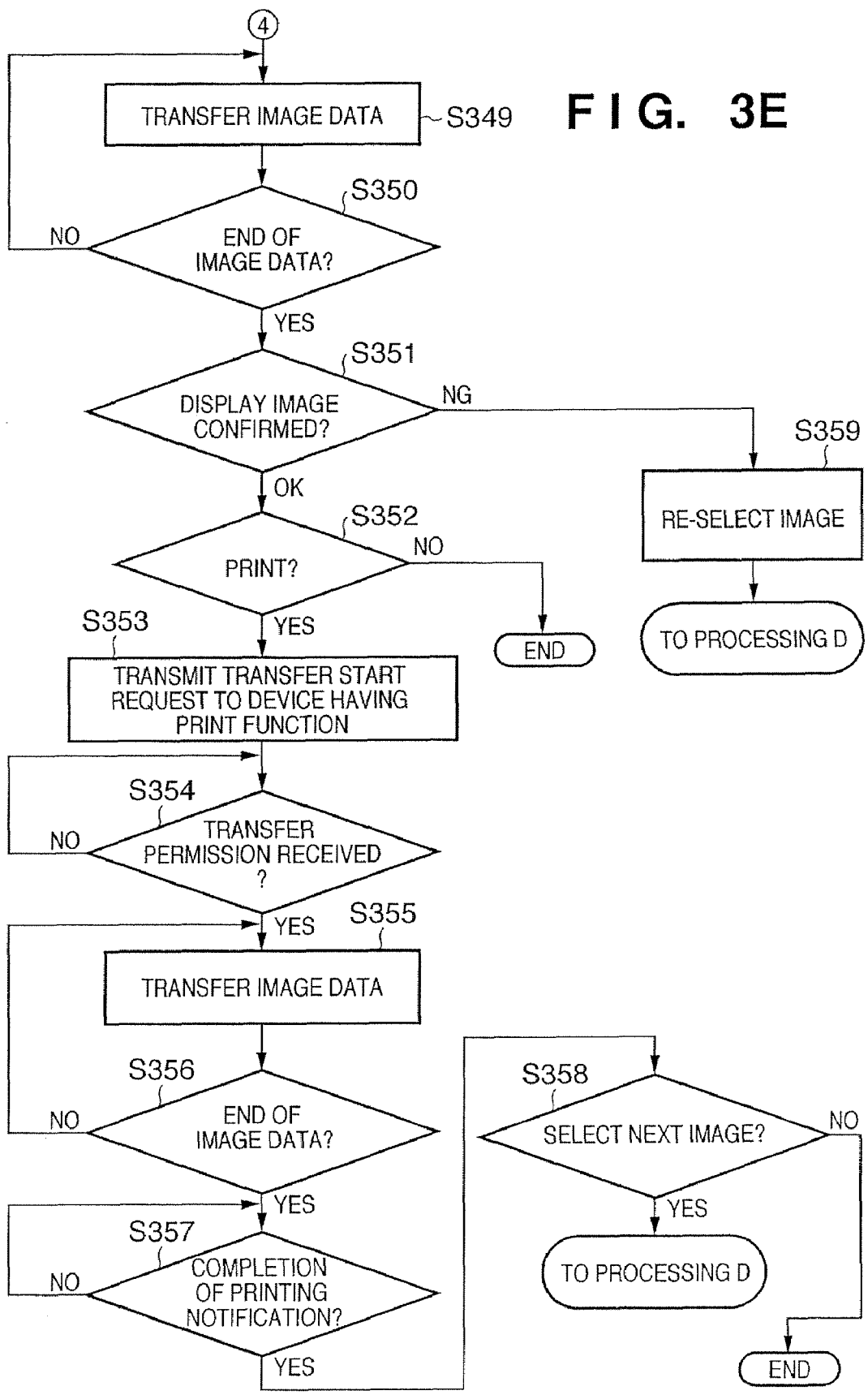
FIG. 3E is a flowchart for explaining the operation of the digital camera 100 according to the first embodiment of the present invention.
Figure 3F:
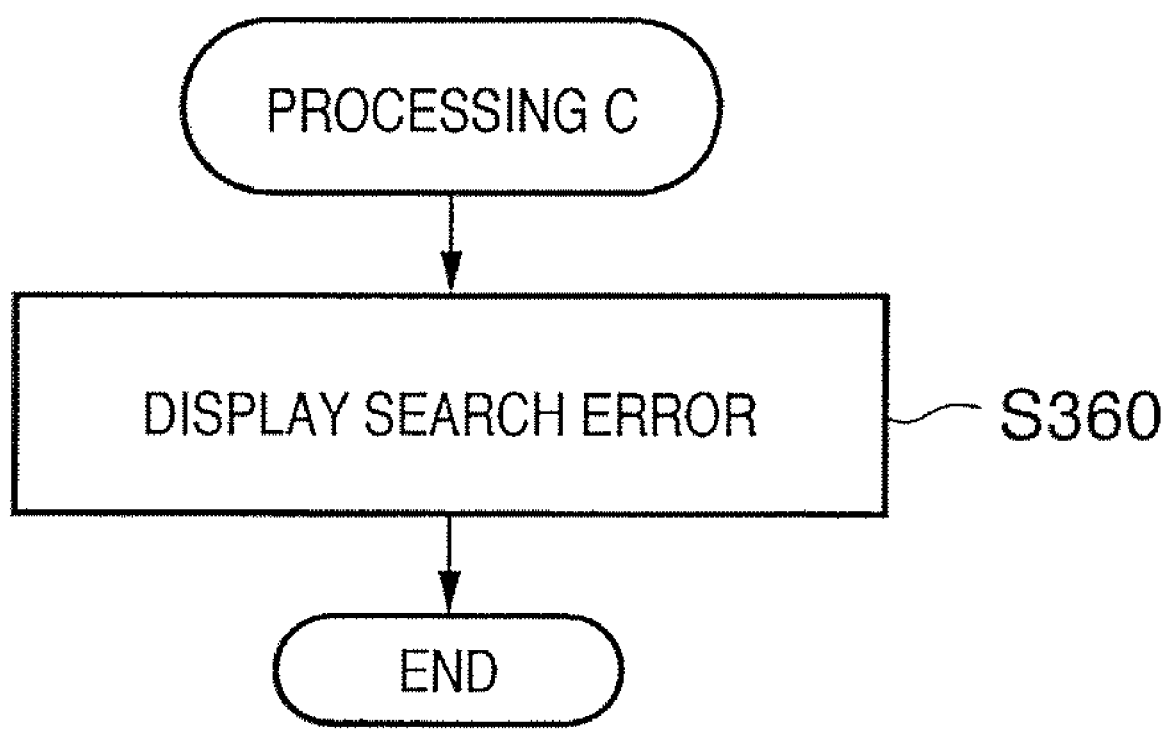
FIG. 3F is a flowchart for explaining the operation of the digital camera 100 according to the first embodiment of the present invention.
Figure 3G:
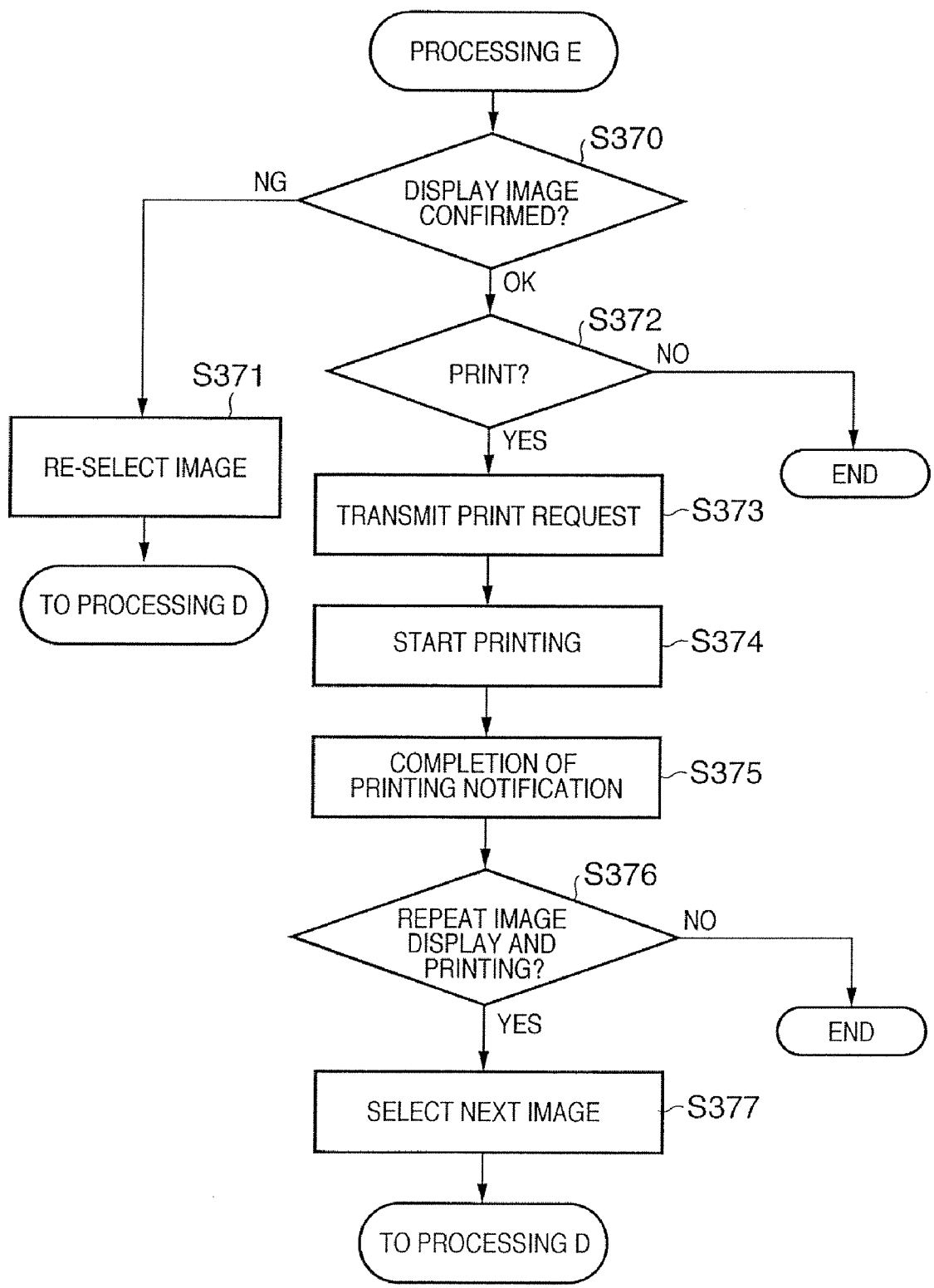
FIG. 3G is a flowchart for explaining the operation of the digital camera 100 according to the first embodiment of the present invention.

FIG. 3G is a flowchart for explaining the contents of processing E executed if YES in step S334 in FIG. 3C. In step S370, the user confirms the image displayed on the display unit 1108 of the other wireless communication device having the display function and print function, and if he or she is not satisfied with that image (NG in S370), the process advances to step S371, and the user re-selects an image. The process then advances to processing D, and the processing in step S319 and subsequent steps in FIG. 3B is executed.

If it is determined that the user is satisfied with the image displayed on the display unit 1108 (OK in S370), the process advances to step S372 to check if the image is to be printed using the print function of the other wireless communication device. If it is determined in step S372 that the image is not printed (NO in S372), the processing ends. If the image is to be printed (YES in S372), the user selects the print button on the operation display unit 1101 of the digital camera 100 to transmit a print request to the other wireless communication device having the display function and print function (S373). Upon reception of this print request, the other wireless communication device reads out the image data cached in the memory 1116 upon displaying the image data, and starts print processing (S374).

Upon completion of printing, the other wireless communication device notifies the digital camera 100 of this (S375) to prompt the user to determine whether or not to repeat image display and printing (S376). If the display and printing of the next image are repeated (YES in S376), the process advances to step S377 to select the next image (S377). The process then advances to processing D, and the processing in step S319 and subsequent steps in FIG. 3B is executed.

If the image display and printing are not repeated (NO in S376), the communication unit 1103 of the digital camera 100 transmits a communication disconnection request to the other wireless communication device having the display function and print function, and receives a disconnection confirmation signal. The communication unit 1103 executes end processing.

The processing executed when the route selected in step S317 in FIG. 3B is ROUTE2 will be described below with reference to the flowcharts of FIGS. 3D and 3E. In case of ROUTE2, the digital camera 100 executes the processing in step S335 and subsequent steps of the flowchart of FIG. 3D.

The controller 1107 of the digital camera 100 checks in step S335 if both a flag CONN1 indicating the connection state with another wireless communication device having the display function (e.g., device B—display 101 in FIG. 1) and a flag CONN2 indicating the connection state with another wireless communication device having the print function (e.g., device C—printer 102 in FIG. 1) are set to be "1".

If it is determined in step S335 that both the devices are connected (YES in S335), the process jumps to step S347 to transmit an image transfer start request to the other wireless communication device having the display function (S347).

If it is determined in step S335 that one of the devices is not connected (NO in S335), the process advances to step S336 to start the counting of the connection timer and to set an address of the other wireless communication device having the display function (device B—display 101 in FIG. 1) (S337). The controller 107 then transmits a connection request to the other wireless communication device having the display function (S338). The controller 1107 then sets an address of the other wireless communication device having the print function (device C—printer 102 in FIG. 1) (S339), and transmits a connection request to the other wireless communication device having the print function (S340).

The controller 1107 checks in step S341 if a connection confirmation is received from the other wireless communication device having the display function (S341). If the digital camera 100 is connected the other wireless communication device having the display function (YES in S341), the controller 1107 sets "1" in the flag (CONN1) indicating the connection state with the other wireless communication device having the display function (S342).

The controller 1107 checks if a connection confirmation has been received from the other wireless communication device having the print function (S343). If the digital camera 100 is connected the other wireless communication device having the print function (YES in S343), the controller 1107 sets "1" in the flag (CONN2) indicating the connection state with the other wireless communication device having the print function (S344). The controller 1107 repeats the processing until "1" is set in both the flags CONN1 and CONN2 (S341 to S345). Note that the processing in steps S337 to S346 has been described under the assumption that both the other wireless communication device having the display function and that having the print function are not connected.

If one of these devices has already been connected, connection processing with the non-connected device may be executed.

If it is determined in step S345 that "1" is set in both the flags (YES in S345), the controller 1107 stops counting of the connection timer (S346). In step S347, the communication unit 1103 of the digital camera 100 transmits an image transfer start request to the other wireless communication device having the display function. If an image transfer permission is received from the other wireless communication device having the display function (YES in S348), the communication unit 1103 transfers image data (S349). When the user selects an image on the operation display unit 1101 of the digital camera 100, and selects the display button, the selected image data is transmitted to the other wireless communication device having the display function. This image data is displayed on the display unit 1108 of the other wireless communication device having the display function.

Upon completion of transfer of the image data (YES in S350), the process advances to step S351. If it is determined in step S351 that the user is satisfied with the image displayed on the display unit 1108 of the other wireless communication device having the display function (OK in S351), the process advances to step S352 to check if the image is to be printed using the other wireless communication device having the print function. If it is determined in step S352 that the image is not printed (NO in S352), the processing ends. If the image is to be printed (YES in S352), the user selects the print button displayed on the operation display unit 1101 of the digital camera 100, thereby transmitting an image transfer request to the other wireless communication device having the print function (S353).

The digital camera 100 checks if transfer permission has been received from the other wireless communication device which received the image transfer start request. If the transfer permission is received (YES in S354), the communication unit 1103 of the digital camera 100 starts transfer of the image data to the other wireless communication device having the print function (S355), and executes transfer processing until the image data ends (S356). Upon reception of the image data, the other wireless communication device having the print function starts print processing of the image data. Upon completion of the print processing (YES in S357), the device transmits a signal indicating completion of the print processing to the digital camera 100 (S357) to prompt the user to determine whether or not to print the next image (S358). If the user wants to select and print the next image (YES in S358), the process advances to processing D of the flowchart of FIG. 3B to execute the processing in steps S319 and subsequent steps in FIG. 3B.

On the other hand, if the user does not want to select the next image to be printed (NO in S358), the communication unit 1103 of the digital camera 100 transmits a communication disconnection request to the other wireless communication device having the display function (display 101 in FIG. 1) and that having the print function (printer 102 in FIG. 1), and receives disconnection confirmation signals. The communication unit 1103 executes end processing.

If it is determined in step S351 that the user is not satisfied with the display image displayed on the display of the other wireless communication device having the display function (NG in S351), the process advances to step S359, and the user re-selects an image. The process then advances to processing D in FIG. 3B.

Upon checking the route in step S320 of FIG. 3B, if the controller 1107 of the digital camera 100 determines that neither ROUTE1 nor ROUTE2 are selected (NO in S319, NO in S320), it notifies the operation display unit 1101 that the functions desired by the user cannot be acquired. The operation display unit 1101 displays a search error message to notify the user of that information (processing C: step S360 in FIG. 3F).

In this embodiment, as the processing of the digital camera 100, that for making the display 101 display an image to confirm the next image to be printed can be parallelly executed until print processing of the printer 102 is completed.

As described above, according to this embodiment, when devices are connected via wireless communications, selection of a communication route required to use a plurality of services and devices in collaboration with each other can be easily set according to devices.

Second Embodiment

Figure 4:
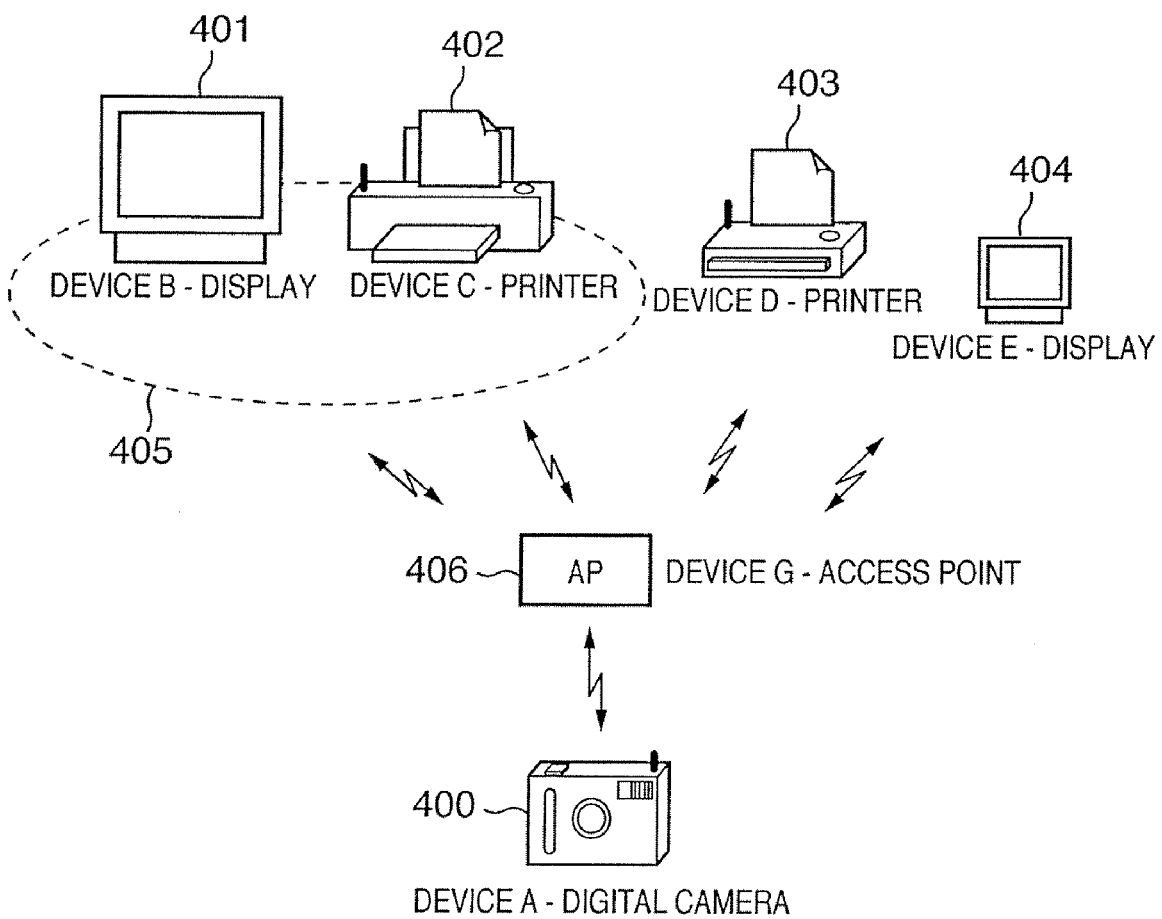
FIG. 4 is a view showing the overall arrangement of a wireless communication system including wireless communication devices according to the second embodiment of the present invention.

The second embodiment of the present invention will be described below. FIG. 4 shows the overall arrangement of a wireless communication system including wireless communication devices according to the second embodiment of the present invention. Referring to FIG. 4, reference numeral 400 denotes a wireless communication device according to one embodiment of the present invention.

FIG. 4 shows the following wireless communication devices. That is, reference numeral 400 denotes a digital camera (to be referred to as "device A—digital camera" hereinafter) having wireless communication means; and 401, a display (to be referred to as "device B—display" hereinafter) having wireless communication means. Reference numeral 402 denotes a printer (to be referred to as "device C—printer" hereinafter) having wireless communication means; 403, a printer (to be referred to as "device D—printer" hereinafter) having wireless communication means; and 404, a display (to be referred to as "device E—display" hereinafter) having wireless communication means. A device F—display printer 405 is obtained by virtually grouping the device B—display 401 and device C—printer 402 as one device, and the device B—display 401 and device C—printer 402 have no relation between them and can operate independently of each other. Reference numeral 406 denotes an access point which has a wireless communication unit and serves as that for devices A to F (to be referred to as "device G—access point" hereinafter).

The device A—digital camera 400 (to be also simply referred to as "digital camera 400" hereinafter), the device B—display 401 (to be also simply referred to as "display 401" hereinafter), the device E—display 404 (to be also simply referred to as "display 404" hereinafter), the device C—printer 402 (to be also simply referred to as "printer 402" hereinafter), and the device D—printer 403 (to be also simply referred to as "printer 403" hereinafter) shown in FIG. 4 have the same arrangements as those of the digital camera 100, display 101, and printer 102 shown in FIGS. 11A to 11D, and a repetitive description thereof will be avoided. The communication unit of the device G—access point 406 (to be also simply referred to as "access point 406" hereinafter) can exchange data including commands and captured images with other devices by wireless communications based on spread spectrum such as a communication based on the IEEE802.11b standard, or Bluetooth®.

The digital camera 400, the displays 401 and 404, the printers 402 and 403, and the display printer 405 shown in FIG. 4 can exchange, via the access point 406, data including commands and captured images to each other by wireless communications based on spread spectrum such as a communication based on the IEEE802.11b standard, or Bluetooth®.

FIG. 2 shows a wireless communication device list after the digital camera 400 registers wireless communication devices (e.g., the displays 401 and 404, printers 402 and 403, and display printer 405) which can communicate using the Bluetooth® wireless communication standard. A Registered Device Area field represents the area names where the registered devices exist, and is categorized into, for example, "My Living", "My Room", "My Office", and "Meeting Room1". A registered device Property List field includes detailed information of each of the registered devices (the displays 401 and 404, printers 402 and 403, display printer 405, and the like), and the detailed information includes a DEVICE CLASS indicating the device attribute of each device, a Group Name (this means that devices having an identical group name belong to the identical group) upon grouping, a Bluetooth® Address (indicating a physical address of a device expressed by 6 bytes). Authentication (ON/OFF), and a PIN CODE (identification number).

FIG. 10 shows a wireless communication device after the digital camera 400 registers devices which can communicate using the IEEE802.11 wireless communication standard. A Registered Device Area field represents the area names where the registered devices exist, and is categorized into, for example, "My Living", "My Room", "My Office", and "Meeting Room1". A registered device Property List field include detailed information of each of the registered devices (the displays 401 and 404, printers 402 and 403, display printer 405, and the like), and the detailed information includes a Device Class indicating the device attribute of each device, a Group Name (this means that devices having an identical group name belong to the identical group) upon grouping, SSID indicating a network name, Connection Type indicating Adhoc/Infra, AuthType indicating authentication to be used of WPA, WPAPSK, Open, and the like, Encryption indicating encryption to be used of AES, WEP, TKIP, and the like, networkKey indicating data of that cipher, EAP indicating whether or not authentication requires a certificate, Channel indicating a channel value that can be assumed, UUID fixed indicating an ID unique to the registered device, and IP resolve indicating how to acquire an IP address.

The controller 1107 of the digital camera 400 compares pairing information of grouped devices with a search result with reference to the wireless communication device list shown in FIG. 2 or 10 to check if the pairing information matches the search result. The controller 1107 selects a communication route corresponding to the selected wireless communication devices to make a wireless communication between the devices, thus allowing data processing by collaborating a plurality of devices.

Figure 9A:
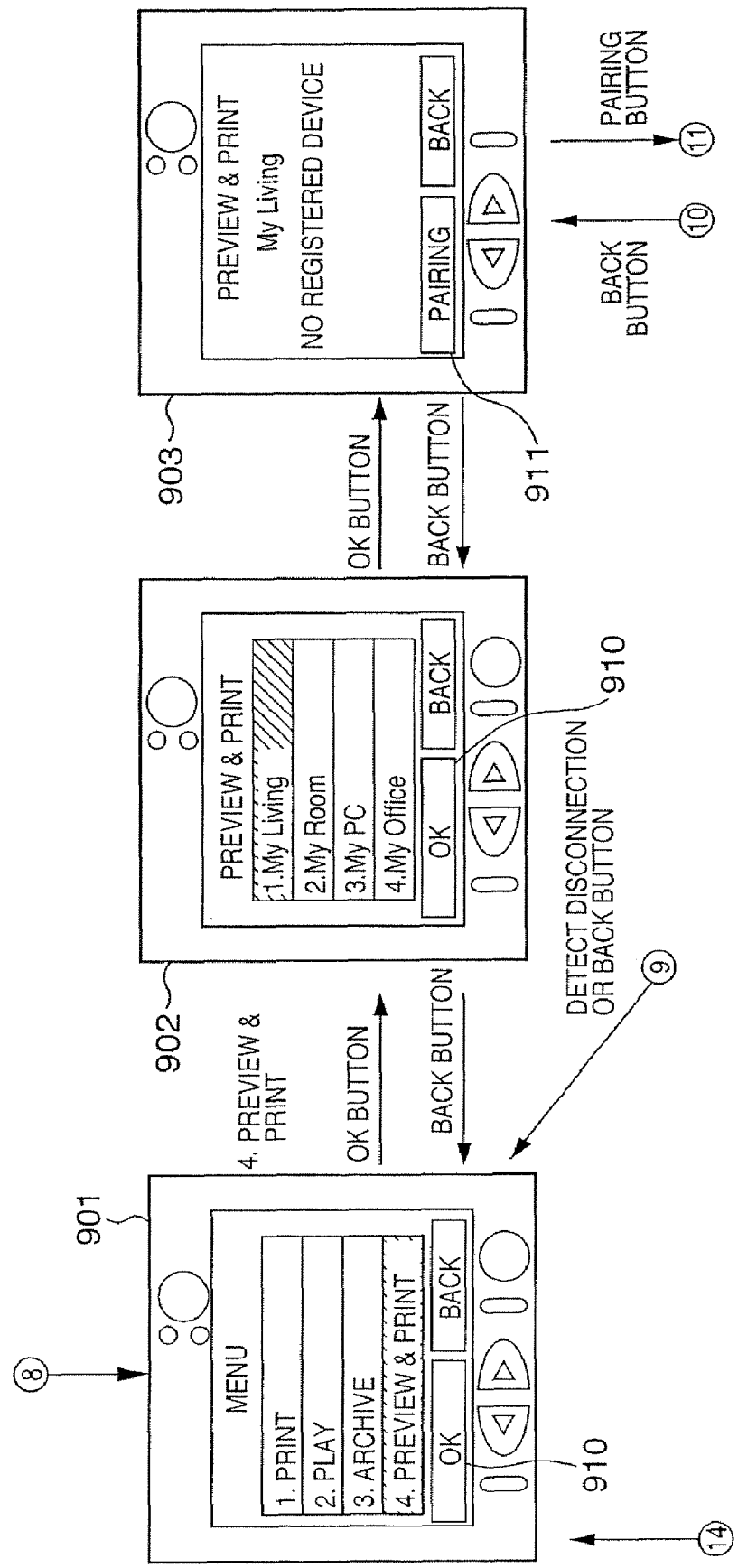
FIG. 9A shows a display example of an operation display unit of the digital camera 400 according to the second embodiment of the present invention.
Figure 9B:
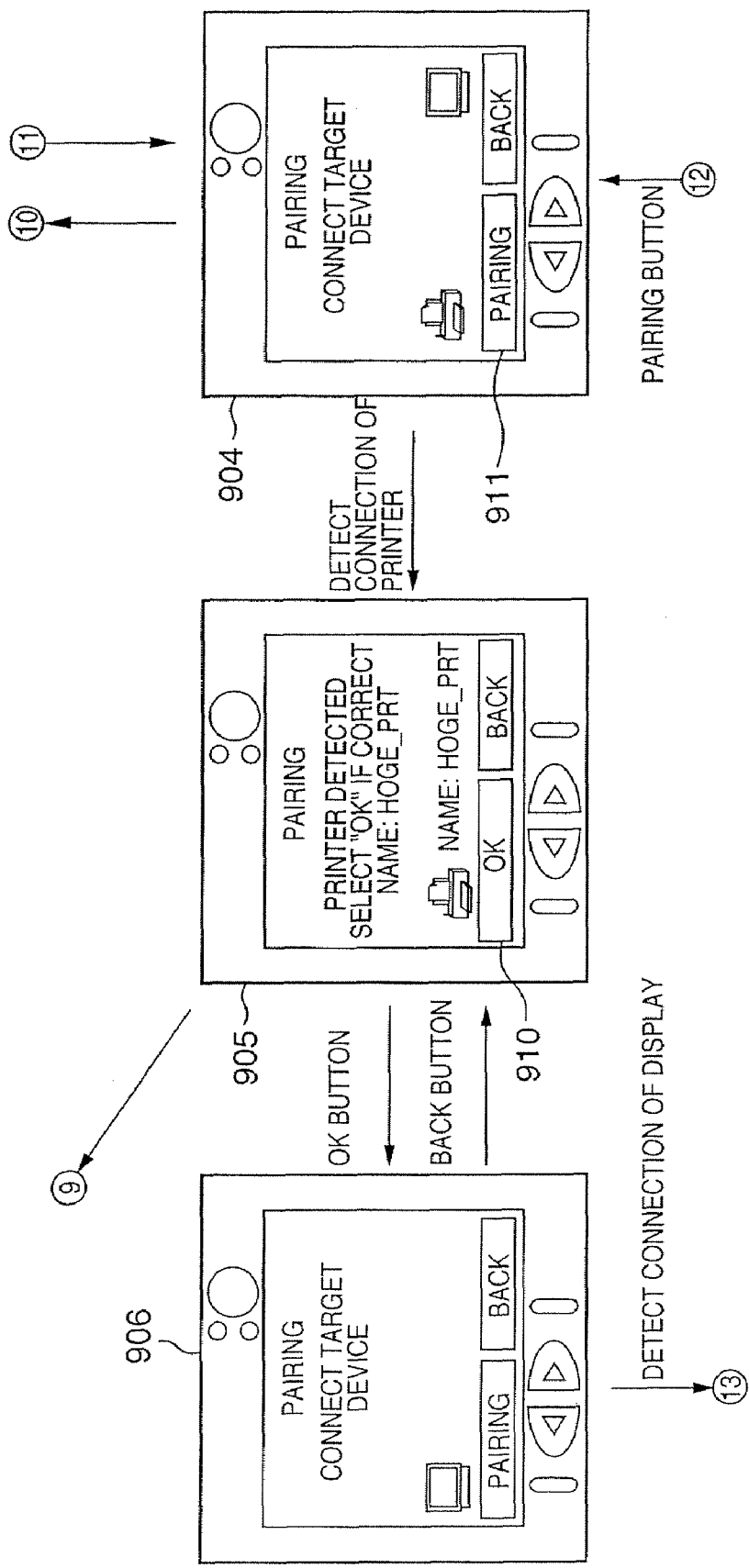
FIG. 9B shows a display example of the operation display unit of the digital camera 400 according to the second embodiment of the present invention.

FIGS. 9A, 9B, and 9C show the display contents on the operation display unit 1101 of the digital camera 400 and its window transition in association with acquisition of wireless information between wireless communication devices and the settings (pairing) related to grouping of devices. A case will be exemplified wherein the digital camera 400 pairs the display 401 and printer 402 as one group based on FIGS. 9A, 9B, and 9C.

As shown in a window 901, when the user selects "preview & print (a device having a display function and print function) from a menu window and presses an OK button 910, the window 901 of the operation display unit 1101 transits to a window 902. The window 902 displays the registered area categories. When the user selects "My Living" from the window 902, and presses the OK button 910, the window 902 transits to a window 903. The window 903 displays that the device which can implement "preview & print" (the device having the display function and print function) selected on the window 901 is not registered in the registered device area ("My Living") selected on the window 902.

When the user presses a pairing button 911 on the window 903, the window 903 transits to a window 904 to switch to a window display "connect target device". In order to connect the digital camera 400 and the printer 402 as the device having the print function first according to this window display, the digital camera 400 detects the printer 402 according to transmission of a search request and reception of a search response. When the digital camera 400 receives a response to a service acquisition request from the printer 402 and detects a connection response to the printer 402, the window 904 transits to a window 905 to display that printer name, for example, "HOGE_PRT", on the operation display unit 1101 of the digital camera 400.

When the user presses the OK button 910, information associated with wireless communications of the printer 402 is transferred from the printer 402 to the digital camera 400. The information associated with wireless communications corresponds to the contents of the registered device Property List shown in FIG. 10 described above.

Subsequently, upon pressing of the OK button 910 by the user, the window 905 transits to a window 906 to switch to a window display "connect target device". In order to connect the digital camera 400 and the display 401 as the device having the display function according to this window display, the digital camera 400 detects the display 401 according to transmission of a search request and reception of a search response. When the digital camera 400 receives a response to a service acquisition request from the display 401 and detects a connection response to the display 401, the window 906 transits to a window 907 to display that display name, for example, "HOGE_DSP", on the operation display unit 1101 of the digital camera 400.

The user presses the OK button 910 to transit to a window 908. This window 908 displays contents indicating if the above printer 402 and display 401 are "to be grouped?". Upon pressing of the OK button 910, the window 908 transits to a window 909 to register "printer 402" and "display 401" as a pair with a group name "DPL888" (915) in the registered device area "My Living". Based on grouping set on this window, the display 401 and printer 402 can integrally function as the display printer 405.

Figure 7B:
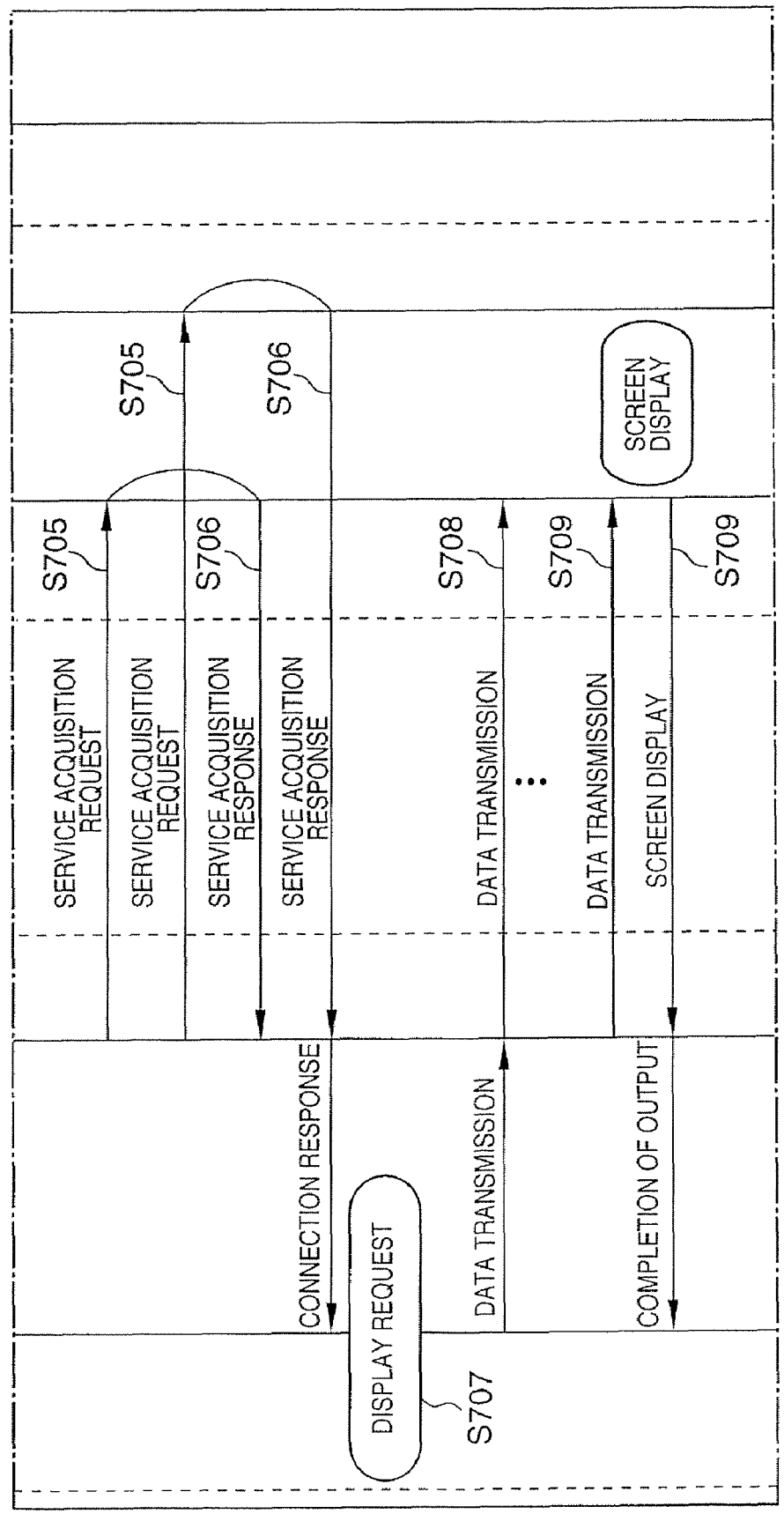
FIG. 7B is a sequence chart of the digital camera 400, display 401, printer 402, and display 404 according to the second embodiment of the present invention.

FIGS. 7A, 7B, and 7C are sequence charts for explaining the procedures of the operation of the entire wireless system after execution of pairing according to the embodiment of the present invention. The procedures of the processing in the wireless system after execution of pairing will be described below with reference to FIGS. 7A, 7B, and 7C.

On the digital camera 400, when the user selects "preview & print" and then selects grouped device grouping (Grp) from the operation display unit 1101 (S701), the communication unit 1103 transmits a device search request, and broadcasts a device search request signal to devices which exist on the identical network (S702). Upon reception of search responses from other devices (S703), the digital camera 400 compares the previous pairing and device information acquired by the current search (pairing information comparison processing) (S704). The digital camera 400 extracts, as an identical group, only desired devices from the plurality of devices on the network, which returned the responses.

Thus, the digital camera 400 transmits a service acquisition request that allows use of the display 401 and printer 402 in response to requests from the digital camera to only the device group of the display 401 and printer 402 selected on the digital camera 400 side (S705). The communication unit of the digital camera 400 receives responses to the service acquisition request as connection responses (S706), and the operation display unit of the digital camera 400 displays devices that allow connection of the previously selected devices (S707). The operation display unit 1101 recognizes reception of the responses from the device having the display function and that having the printer function from the connection responses, and displays a display button and print button that make the user input an image display instruction using the display 401 and a print instruction using the printer 402 (S707).

When the user selects an image and then selects the display button, the digital camera 400 transmits image data to the display 401 (S708). After the last block of the image data is transmitted, the digital camera 400 receives information indicating completion of a screen display from the display 401 after the screen display on the display 401 (S709). The digital camera 400 waits until a print request is input. After the digital camera 400 notifies the user of completion of display (S710), the user confirms the display image on the display 401. If the user is satisfied with the displayed image and wants to print the image displayed on the display 401, he or she selects the print button to input a print instruction, thus issuing a print request (S711). The communication unit 1103 then transmits the print request to the printer 402 (S712). After the communication unit 1103 of the digital camera 400 transmits the last block of the image data to the printer 402, the printer 402 notifies the communication unit 1103 of the digital camera 400 of completion of printing after completion of printing (S713). The digital camera 400 displays completion of printing on the operation display unit 1101 to notify the user of it (S714), and stands by in a wait state of an operation input as to whether or not to end processing. If the user wants to repeat preview & print, the process advances to selection of the next image (S715) to repeat the aforementioned processes (S707 to S714).

If the user inputs an end request (S716), the communication unit 1103 of the digital camera 400 transmits a communication disconnection request to the display 401 and printer 402 (S717), and receives disconnection confirmation signals from the display 401 and printer 402 (S718). The communication unit 1103 executes end processing (S719).

The operation of the digital camera 400 according to the second embodiment of the present invention will be described below with reference to the flowcharts of FIGS. 8A, 8B, and 8C.

Figure 8A:
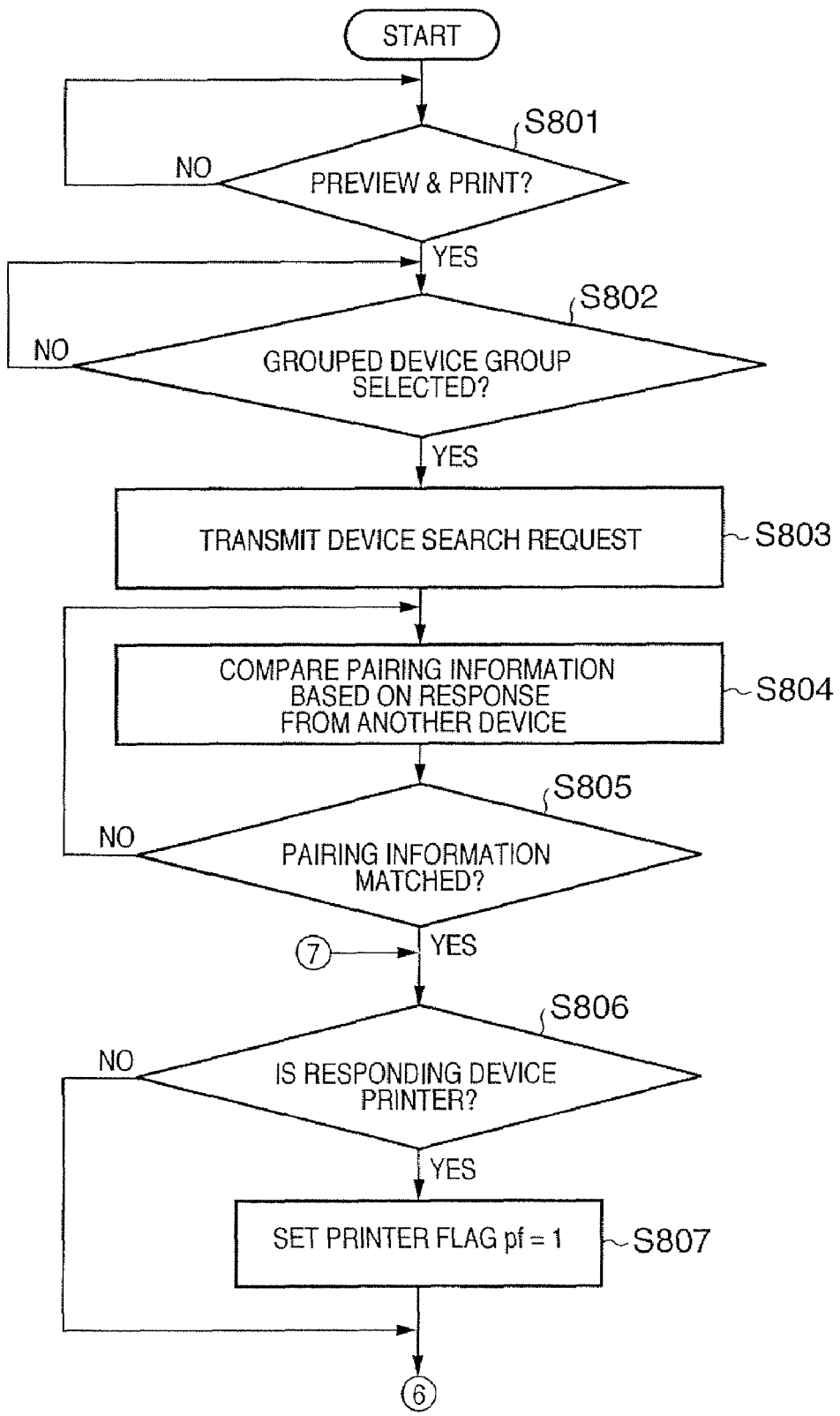
FIG. 8A is a flowchart for explaining the procedure of the detailed operation of the digital camera 400 according to the second embodiment of the present invention.
Figure 8B:
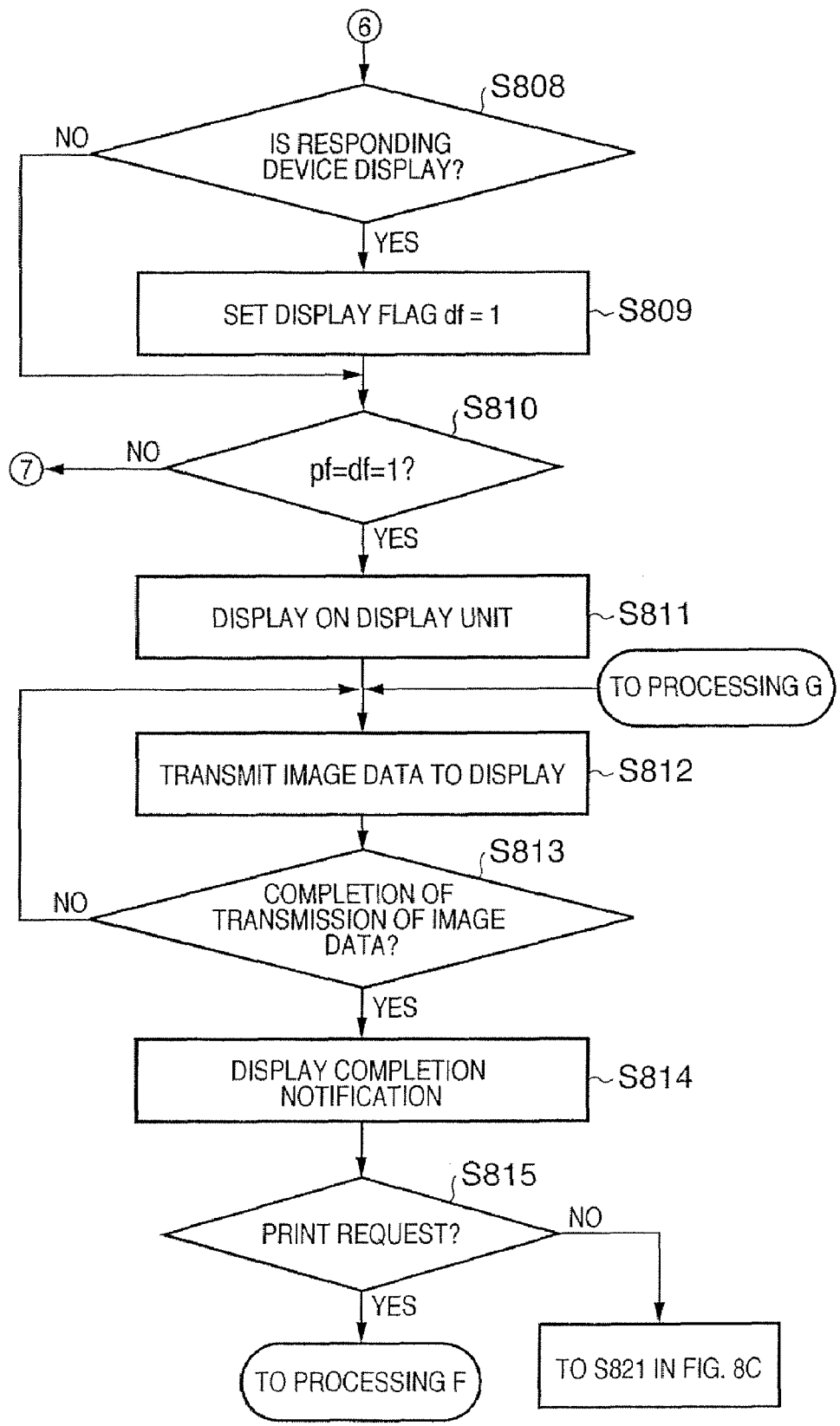
FIG. 8B is a flowchart for explaining the procedure of the detailed operation of the digital camera 400 according to the second embodiment of the present invention.

If the controller 1107 of the digital camera 400 determines in step S801 of FIG. 8A that the user selects "preview & print" from the operation display unit 1101 of the digital camera 400 (YES in S801), the process advances to step S802 to check if the user selects grouped device group (Grp) from the operation display unit 1101. If the user selects the grouped device group from the operation display unit 1101 (YES in S802), the communication unit 1103 broadcasts a device search request to devices which exist on the identical network in step S803.

In step S804, the communication unit 1103 receives responses from other wireless communication devices and compares the previous pairing with device information acquired in the current search (pairing information comparison processing). The pairing information comparison processing is based on device search responses to the device search request to compare whether or not pairing information (information of devices grouped as those to be paired) set in the aforementioned wireless communication device list (FIGS. 2 and 10) matches each response. The device search responses from other wireless communication devices which do not match the pairing information are ignored.

If the pairing information matches (YES in S805), the controller 1107 extracts, as an identical group, only desired devices from the plurality of devices on the network, which returned the responses to the digital camera 400. More specifically, the controller 1107 checks if another wireless communication device (responding device) which returned the device search response to the digital camera 400 is a printer (S806). If the responding device is a printer (YES in S806), the controller 1107 sets a printer flag (pf) indicating the other wireless communication device having the print function to "1" (S807). If the responding device is not a printer (NO in S806), the process jumps to step S808.

If the responding device is a display (YES in S808), the controller 1107 sets a display flag (df) indicating the other wireless communication device having the display function to "1" (S809), and repeats the processes in steps S806 to S809 until both the printer flag (pf) and display flag (df) are set to "1" (S810).

If both the printer flag (pf) and display flag (df) are set to "1" (YES in S810), the controller 1107 notifies the operation display unit 1101 that other wireless communication devices as those to be paired can be detected (S811). The controller 1107 recognizes reception of the responses from the device having the display function and that having the print function from, for example, the connection responses, and operation display unit 1101 displays the display button and print button which make the user input an image display instruction using the display 401 and a print instruction using the printer 402.

When the user selects an image displayed on the operation display unit 1101 and then selects the display button, the communication unit 1103 transmits image data to the display 401 in step S812. Upon completion of transmission of the last block of the image data (YES in S813), the display 401 notifies the communication unit 1103 of the digital camera 400 of completion of display (S814), thus waiting for input of a print request.

If the user is satisfied with the image displayed on the display 401 and wants to print that image displayed on the display 401, he or she selects the print button on the operation display unit 1101 to issue a print request according to that print instruction. If the print request is issued in step S815 (YES in S815), the process advances to step S817 in the flowchart of FIG. 8C (processing F). On the other hand, if the print request is not issued (NO in S815), the process advances to step S821 in FIG. 8C.

Figure 8C:
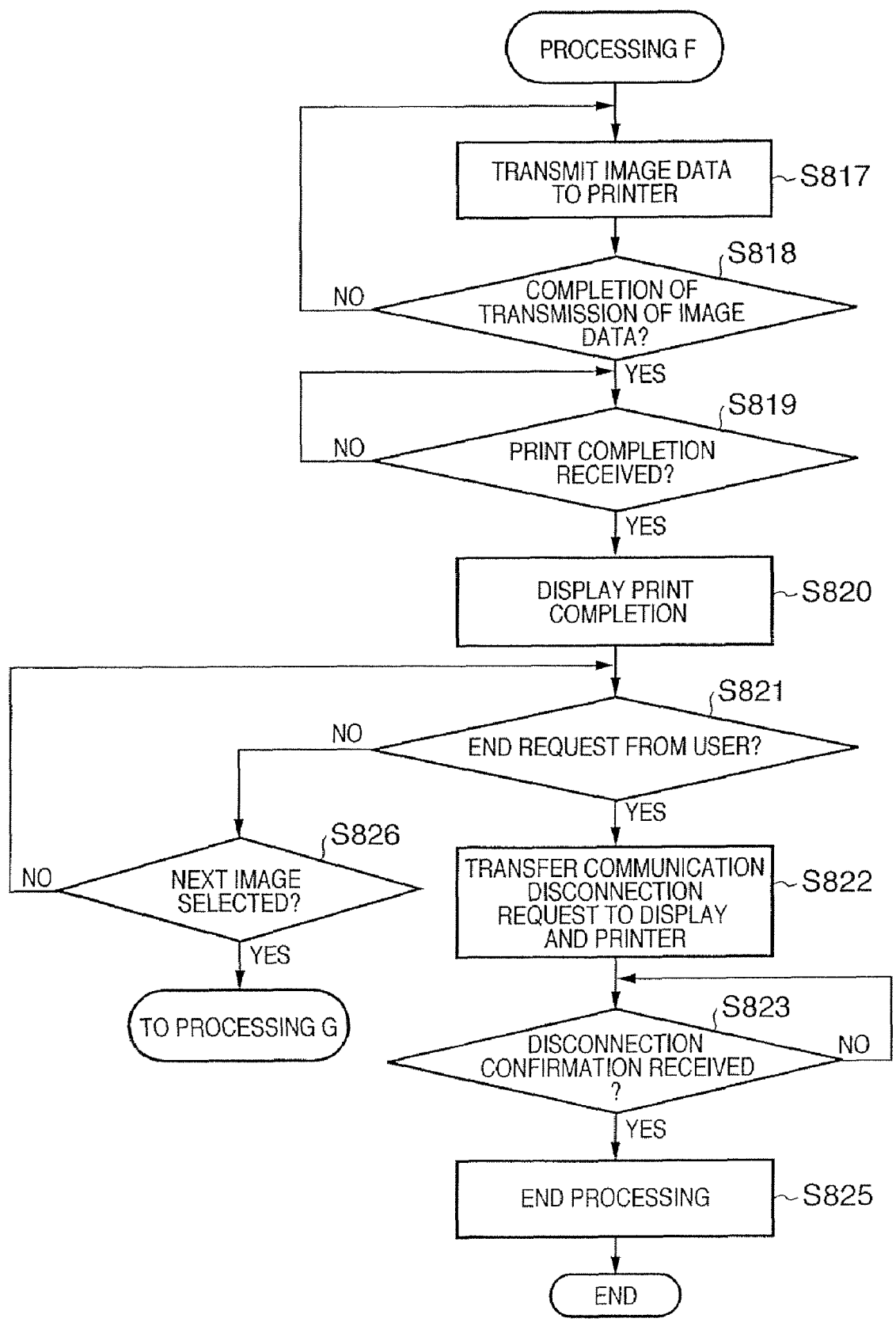
FIG. 8C is a flowchart for explaining the procedure of the detailed operation of the digital camera 400 according to the second embodiment of the present invention.

If the print request is issued, the communication unit 1103 transmits image data to the printer 402 in step S817 in FIG. 8C. The communication unit 1103 of the digital camera 400 executes transmission processing of the image data until transmission of the last block of the image data is completed (NO in S818). Upon completion of the image data from the communication unit 1103 of the digital camera 400 to the printer 402 (YES in S818), the communication unit 1103 stands by in a reception wait state of a print completion notification transmitted from the printer 402 (S819). Upon reception of the print completion notification (YES in S819), the communication unit 1103 of the digital camera 400 displays a print completion message on the operation display unit 1101 of the digital camera 400 (S820).

Subsequently, the controller 1107 checks if the user inputs an end request to the operation display unit 1101 of the digital camera 400 (S821). If the user inputs the end request (YES in S821), the communication unit 1103 of the digital camera 400 transmits a communication disconnection request to the display 401 and printer 402 (S822). Upon reception of disconnection confirmation signals from the display 401 and printer 402 (YES in S823), the communication unit 1103 of the digital camera 400 executes end processing (S825).

On the other hand, if the user does not input any end instruction (NO in S821), the user selects the next image (S826) to continue to repeat the image display on the display 401 and the print processing to the printer 402 (processing G: return to S812 of FIG. 8B).

According to this embodiment, the pairing information of the grouped devices is compared with a search result, and a communication route corresponding to the selected devices is selected to make a communication between the devices, thus allowing data processing by collaboration of a plurality of devices. In this way, for example, operation errors, for example, transfer of important image data to a non-registered device and the like can be prevented.

Other Embodiments

Note that the objects of the present invention are also achieved by supplying a storage medium, which records a program code of software that can implement the functions of the above-mentioned embodiments to a controller of a wireless communication device, and reading gout and executing the program code stored in the storage medium by a computer (or a CPU or MPU) of the controller.

In this case, the program code itself read out from the storage medium implements the functions of the aforementioned embodiments, and the storage medium which stores the program code constitutes the present invention.

As the storage medium for supplying the program code, for example, a flexible disk, hard disk, optical disk, magneto-optical disk, CD-ROM, CD-R, DVD, nonvolatile memory card, ROM, and the like may be used.

The functions of the above-mentioned embodiments may be implemented not only by executing the readout program code by the computer but also by some or all of actual processing operations executed by an OS (operating system) running on the computer based on an instruction of the program code.

Furthermore, the functions of the above-mentioned embodiments may be implemented by some or all of actual processing operations executed by a CPU or the like arranged in a function expansion board or a function expansion unit, which is inserted into or connected to the computer, after the program code read out from the storage medium is written in a memory of the expansion board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-38319, filed Feb. 15, 2005, which is hereby incorporated by reference herein in its entirety.

The invention claimed is:

1. A communication apparatus comprising:
a search unit adapted to search for another communication apparatus;
a determination unit adapted to determine a function of the other communication apparatus searched by said search unit;
a selection unit adapted to select a communication route required to communicate with the other communication apparatus in accordance with the determined function of the other communication apparatus;
a communication unit adapted to communicate data to the other communication apparatus in accordance with the communication route selected by said selection unit; and
a setting unit adapted to set, as one set, another communication apparatus having a first function and still another communication apparatus having a second function so as to configure the plurality of functions,
wherein a transmission order of data to the communication apparatus having the first function and the communication apparatus having the second function set as one set by said setting unit is determined in advance.

2. A communication apparatus comprising:
a search unit adapted to search for another communication apparatus;
a determination unit adapted to determine a function of the other communication apparatus searched by said search unit;
a selection unit adapted to select a communication route required to communicate with the other communication apparatus in accordance with the determined function of the other communication apparatus;
a communication unit adapted to communicate data to the other communication apparatus in accordance with the communication route selected by said selection unit;
a setting unit adapted to set, as one set, another communication apparatus having a first function and still another communication apparatus having a second function so as to configure the plurality of functions, and
a comparison unit adapted to compare information of the other communication apparatus searched by said search unit, and information of the communication apparatus set by said setting unit.

3. A communication apparatus comprising:
a search unit adapted to search for another communication apparatus;
a determination unit adapted to determine a function of the other communication apparatus searched by said search unit;
a selection unit adapted to select a communication route required to communicate with the other communication apparatus in accordance with the determined function of the other communication apparatus;
a communication unit adapted to communicate data to the other communication apparatus in accordance with the communication route selected by said selection unit; and
a setting unit adapted to set, as one set, another communication apparatus having a first function and still another communication apparatus having a second function so as to configure the plurality of functions,
wherein a transmission order of data to the communication apparatus having the first function and the communication apparatus having the second function set as one set by said setting unit is determined in advance, and
said selection unit sets communication routes required for said communication unit to make communications for only other communication apparatuses having the first function and the second functions set as one set by said setting unit.

4. A communication method in a communication apparatus, comprising:
a search step of searching for another communication apparatus;
a determination step of determining a function of the other communication apparatus searched in said search step;
a selection step of selecting a communication route required to communicate with the other communication apparatus in accordance with the determined function of the other communication apparatus;

a communication step of communicating data to the other communication apparatus in accordance with the communication route selected in said selection step; and a setting step of setting, as one set, another communication apparatus having a first function and still another communication apparatus having a second function so as to configure the plurality of functions, wherein a transmission order of data to the communication apparatus having the first function and the communication apparatus having the second function set as one set in said setting step is determined in advance.

5. A communication method in a communication apparatus, comprising:

a search step of searching for another communication apparatus;

a determination step of determining a function of the other communication apparatus searched in said search step;

a selection step of selecting a communication route required to communicate with the other communication apparatus in accordance with the determined function of the other communication apparatus;

a communication step of communicating data to the other communication apparatus in accordance with the communication route selected in said selection step;

a setting step of setting, as one set, another communication apparatus having a first function and still another communication apparatus having a second function so as to configure the plurality of functions, and a comparison step of comparing information of the other communication apparatus searched in said search step, and information of the communication apparatus set in said setting step.

6. A communication method in a communication apparatus, comprising:

a search step of searching for another communication apparatus;

a determination step of determining a function of the other communication apparatus searched in said search step;

a selection step of selecting a communication route required to communicate with the other communication apparatus in accordance with the determined function of the other communication apparatus;

a communication step of communicating data to the other communication apparatus in accordance with the communication route selected in said selection step; and a setting step of setting, as one set, another communication apparatus having a first function and still another communication apparatus having a second function so as to configure the plurality of functions, wherein a transmission order of data to the communication apparatus having the first function and the communication apparatus having the second function set as one set in said setting step is determined in advance, and said selection step sets communication routes required for said communication step to make communications for only other communication apparatuses having the first function and the second functions set as one set in said setting step.

* * * * *